(12) United States Patent
Zywicki, III et al.

(10) Patent No.: US 10,534,383 B2
(45) Date of Patent: Jan. 14, 2020

(54) HVAC CONTROLLER WITH PERFORMANCE LOG

(71) Applicant: Ademco Inc., Golden Valley, MN (US)

(72) Inventors: Stan Zywicki, III, Eden Prairie, MN (US); Cary Leen, Hammond, WI (US); Eric Barton, Eden Prairie, MN (US); Peter Joseph Erickson, Crystal, MN (US); Jonathan Frenz, Minneapolis, MN (US)

(73) Assignee: Ademco Inc., Golden Valley, MN (US)

( * ) Notice: Subject to any disclaimer, the term of this patent is extended or adjusted under 35 U.S.C. 154(b) by 118 days.

(21) Appl. No.: 15/610,406

(22) Filed: May 31, 2017

(65) Prior Publication Data

US 2017/0269618 A1   Sep. 21, 2017

Related U.S. Application Data

(63) Continuation of application No. 13/326,553, filed on Dec. 15, 2011, now abandoned.

(51) Int. Cl.
| | |
|---|---|
| *G05D 23/19* | (2006.01) |
| *F24F 11/30* | (2018.01) |
| *F24F 11/62* | (2018.01) |
| *F24F 11/64* | (2018.01) |
| *F24F 11/52* | (2018.01) |

(52) U.S. Cl.
CPC .......... *G05D 23/1934* (2013.01); *F24F 11/30* (2018.01); *F24F 11/62* (2018.01); *F24F 11/52* (2018.01); *F24F 11/64* (2018.01)

(58) Field of Classification Search
CPC .. F24F 11/30; F24F 11/52; F24F 11/62; F24F 11/64; G05D 23/193
See application file for complete search history.

(56) References Cited

U.S. PATENT DOCUMENTS

| | | | |
|---|---|---|---|
| 4,079,366 | A | 3/1978 | Wong |
| 4,174,807 | A | 11/1979 | Smith et al. |
| 4,206,872 | A | 6/1980 | Levine |
| 4,224,615 | A | 9/1980 | Penz |

(Continued)

FOREIGN PATENT DOCUMENTS

| | | |
|---|---|---|
| DE | 3334117 | 4/1985 |
| EP | 0070414 | 1/1983 |

(Continued)

OTHER PUBLICATIONS

"Comfort™ Programmable Owner's Manual," Carrier Touch-N-Go™, 60 pages, 2010. Catalog No: 0M-TCPHP-4CA, Replaces: OM-TCPHP-3CA.

(Continued)

*Primary Examiner* — Yuhui R Pan
(74) *Attorney, Agent, or Firm* — Shumaker & Sieffert, P.A.

(57) ABSTRACT

An HVAC controller is configured to log and record performance related data related to a performance of an HVAC system over a period of time in one or more performance logs stored in a memory of the HVAC controller. In some cases, the HVAC controller may be configured to retrieve at least some of the performance related data from the performance log that corresponds to a selected period of time that may be selected by a user, and display the retrieved performance related data on a display of the HVAC controller.

20 Claims, 23 Drawing Sheets

(56) References Cited

U.S. PATENT DOCUMENTS

| | | |
|---|---|---|
| 4,264,034 A | 4/1981 | Hyltin et al. |
| 4,296,334 A | 10/1981 | Wong |
| 4,298,946 A | 11/1981 | Hartsell et al. |
| 4,308,991 A | 1/1982 | Peinetti et al. |
| 4,332,352 A | 6/1982 | Jaeger |
| 4,337,822 A | 7/1982 | Hyltin et al. |
| 4,337,893 A | 7/1982 | Flanders et al. |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,503,471 A | 3/1985 | Hanajima et al. |
| 4,506,827 A | 3/1985 | Jamieson et al. |
| 4,556,169 A | 12/1985 | Zervos |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,918,439 A | 4/1990 | Wozniak et al. |
| 4,921,163 A | 5/1990 | Viessmann |
| 4,942,613 A | 7/1990 | Lynch |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,036,698 A | 8/1991 | Conti |
| 5,038,851 A | 8/1991 | Metha |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,329,991 A | 7/1994 | Metha et al. |
| 5,348,078 A | 9/1994 | Dushane et al. |
| 5,351,035 A | 9/1994 | Chrisco |
| 5,369,597 A | 11/1994 | Bujak, Jr. |
| 5,386,577 A | 1/1995 | Zenda |
| 5,390,206 A | 2/1995 | Rein et al. |
| 5,404,934 A | 4/1995 | Carlson et al. |
| 5,414,618 A | 5/1995 | Mock et al. |
| 5,429,649 A | 7/1995 | Robin |
| 5,482,209 A | 1/1996 | Cochran et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitcuhashi |
| 5,544,036 A | 8/1996 | Brown, Jr. et al. |
| 5,566,879 A | 10/1996 | Longtin |
| 5,570,837 A | 11/1996 | Brown et al. |
| 5,590,831 A | 1/1997 | Manson et al. |
| 5,603,451 A | 2/1997 | Helander et al. |
| 5,654,813 A | 8/1997 | Whitworth |
| 5,668,535 A | 9/1997 | Hendrix et al. |
| 5,671,083 A | 9/1997 | Conner et al. |
| 5,673,850 A | 10/1997 | Uptegraph |
| 5,679,137 A | 10/1997 | Erdman et al. |
| 5,682,206 A | 10/1997 | Wehmeyer et al. |
| 5,711,785 A | 1/1998 | Maxwell |
| 5,732,691 A | 3/1998 | Maiello et al. |
| 5,761,083 A | 6/1998 | Brown, Jr. et al. |
| 5,782,296 A | 7/1998 | Metha |
| 5,810,908 A | 9/1998 | Gray et al. |
| 5,818,428 A | 10/1998 | Eisenbrandt et al. |
| 5,833,134 A | 11/1998 | Ho et al. |
| 5,839,654 A | 11/1998 | Weber |
| 5,840,094 A | 11/1998 | Osendorf et al. |
| 5,862,737 A | 1/1999 | Chin et al. |
| 5,873,519 A | 2/1999 | Beilfuss |
| 5,886,697 A | 3/1999 | Naughton et al. |
| 5,901,183 A | 5/1999 | D'Souza |
| 5,902,183 A | 5/1999 | D'Souza |
| 5,909,429 A | 6/1999 | Satyanarayana et al. |
| 5,915,473 A | 6/1999 | Ganesh et al. |
| 5,917,141 A | 6/1999 | Naquin, Jr. |
| 5,917,416 A | 6/1999 | Read |
| D413,328 S | 8/1999 | Kazama |
| 5,937,942 A | 8/1999 | Bias et al. |
| 5,947,372 A | 9/1999 | Tiernan |
| 5,950,709 A | 9/1999 | Krueger et al. |
| 5,966,509 A * | 10/1999 | Abe .................. H04L 41/00 |
| | | 714/4.12 |
| 6,009,355 A | 12/1999 | Obradovich et al. |
| 6,013,121 A | 1/2000 | Chin et al. |
| 6,020,881 A | 2/2000 | Naughton et al. |
| 6,032,867 A | 3/2000 | Dushane et al. |
| D422,594 S | 4/2000 | Henderson et al. |
| 6,059,195 A | 5/2000 | Adams et al. |
| 6,081,197 A | 6/2000 | Garrick et al. |
| 6,084,523 A | 7/2000 | Gelnovatch et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,145,751 A | 11/2000 | Ahmed et al. |
| 6,149,065 A | 11/2000 | White et al. |
| 6,152,375 A | 11/2000 | Robison |
| 6,154,681 A | 11/2000 | Drees et al. |
| 6,167,316 A | 12/2000 | Gloudeman et al. |
| 6,190,442 B1 | 2/2001 | Redner |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,260,765 B1 | 7/2001 | Natale et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,351,693 B1 | 2/2002 | Monie et al. |
| 6,344,861 B1 | 3/2002 | Naughton et al. |
| 6,385,510 B1 | 5/2002 | Hoog et al. |
| 6,394,359 B1 | 5/2002 | Morgan |
| 6,398,118 B1 | 6/2002 | Rosen et al. |
| 6,448,896 B1 | 9/2002 | Bankus et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,478,233 B1 | 11/2002 | Shah |
| 6,502,758 B2 | 1/2003 | Cottrell |
| 6,507,282 B1 | 1/2003 | Sherwood |
| 6,518,953 B1 | 2/2003 | Armstrong |
| 6,518,957 B1 | 2/2003 | Lehtinen et al. |

(56) References Cited

U.S. PATENT DOCUMENTS

| | | |
|---|---|---|
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,596,059 B1 | 7/2003 | Greist et al. |
| D478,051 S | 8/2003 | Sagawa |
| 6,608,560 B2 | 8/2003 | Abrams |
| 6,619,555 B2 | 9/2003 | Rosen |
| 6,621,507 B1 | 9/2003 | Shah |
| 6,663,010 B2 | 12/2003 | Chene et al. |
| 6,685,098 B2 | 2/2004 | Okano et al. |
| 6,726,112 B1 | 4/2004 | Ho |
| D492,282 S | 6/2004 | Lachello et al. |
| 6,783,079 B2 | 8/2004 | Carey et al. |
| 6,786,421 B2 | 9/2004 | Rosen |
| 6,789,739 B2 | 9/2004 | Rosen |
| 6,801,849 B2 | 10/2004 | Szukala et al. |
| 6,810,307 B1 | 10/2004 | Addy |
| 6,810,397 B1 | 10/2004 | Qian et al. |
| 6,824,069 B2 | 11/2004 | Rosen |
| 6,833,990 B2 | 12/2004 | LaCroix et al. |
| 6,842,721 B2 | 1/2005 | Kim et al. |
| 6,868,293 B1 | 3/2005 | Schurr et al. |
| D512,208 S | 12/2005 | Kubo et al. |
| 6,973,410 B2 | 12/2005 | Seigel |
| 7,001,495 B2 | 2/2006 | Essalik et al. |
| D520,989 S | 5/2006 | Miller |
| 7,050,026 B1 | 5/2006 | Rosen |
| 7,055,759 B2 | 6/2006 | Wacker et al. |
| 7,080,358 B2 | 7/2006 | Kuzmin |
| 7,083,109 B2 | 8/2006 | Pouchak |
| 7,083,189 B2 | 8/2006 | Ogata |
| 7,084,774 B2 | 8/2006 | Martinez |
| 7,089,088 B2 | 8/2006 | Terry et al. |
| 7,108,194 B1 | 9/2006 | Hankins, II |
| 7,130,720 B2 | 10/2006 | Fisher |
| D531,588 S | 11/2006 | Peh |
| 7,143,339 B2 | 11/2006 | Weinberg et al. |
| D533,515 S | 12/2006 | Klein et al. |
| 7,146,253 B2 | 12/2006 | Hoog et al. |
| 7,152,806 B1 | 12/2006 | Rosen |
| 7,156,318 B1 | 1/2007 | Rosen |
| 7,163,156 B2 | 1/2007 | Kates |
| 7,188,002 B2 | 3/2007 | Chapman, Jr. et al. |
| D542,236 S | 5/2007 | Klein et al. |
| 7,212,887 B2 | 5/2007 | Shah et al. |
| 7,222,800 B2 | 5/2007 | Wruck |
| 7,225,054 B2 | 5/2007 | Amundson et al. |
| 7,231,605 B1 | 6/2007 | Ramakesavan |
| 7,232,075 B1 | 6/2007 | Rosen |
| 7,240,289 B2 | 7/2007 | Naughton et al. |
| 7,261,762 B2 | 8/2007 | Kang et al. |
| 7,274,973 B2 | 9/2007 | Nichols et al. |
| 7,302,642 B2 | 11/2007 | Smith et al. |
| 7,331,187 B2 | 2/2008 | Kates |
| 7,341,201 B2 | 3/2008 | Stanimirovic |
| 7,354,005 B2 | 4/2008 | Carey et al. |
| RE40,437 E | 7/2008 | Rosen |
| 7,419,532 B2 | 9/2008 | Sellers et al. |
| 7,435,278 B2 | 10/2008 | Terlson |
| 7,451,606 B2 | 11/2008 | Harrod |
| 7,452,396 B2 | 11/2008 | Terlson et al. |
| 7,496,627 B2 | 2/2009 | Moorer et al. |
| 7,505,914 B2 | 3/2009 | McCall |
| 7,542,867 B2 | 6/2009 | Steger et al. |
| 7,556,207 B2 | 7/2009 | Mueller et al. |
| 7,594,960 B2 | 9/2009 | Johansson |
| 7,604,046 B2 | 10/2009 | Bergman et al. |
| 7,617,691 B2 | 11/2009 | Street et al. |
| 7,644,591 B2 | 1/2010 | Singh et al. |
| 7,665,019 B2 | 2/2010 | Jaeger |
| 7,676,282 B2 | 3/2010 | Bosley |
| 7,707,189 B2 | 4/2010 | Haselden et al. |
| 7,713,339 B2 | 5/2010 | Johansson |
| 7,739,282 B1 | 6/2010 | Smith et al. |
| 7,770,242 B2 | 8/2010 | Sell |
| 7,793,056 B2 | 9/2010 | Boggs et al. |
| 7,814,516 B2 | 10/2010 | Stecyk et al. |
| 7,865,252 B2 | 1/2011 | Clayton |
| 7,941,431 B2 | 5/2011 | Bluhm et al. |
| 7,952,485 B2 | 5/2011 | Schecter et al. |
| 7,957,775 B2 | 6/2011 | Allen, Jr. et al. |
| 7,984,220 B2 | 7/2011 | Gerard et al. |
| 8,032,254 B2 | 10/2011 | Amundson et al. |
| 8,087,593 B2 | 1/2012 | Leen |
| 8,091,796 B2 | 1/2012 | Amundson et al. |
| 8,167,216 B2 | 5/2012 | Schultz et al. |
| 8,239,066 B2 | 8/2012 | Jennings et al. |
| 8,280,556 B2 | 10/2012 | Besore et al. |
| 8,892,223 B2 | 11/2014 | Leen et al. |
| 8,902,071 B2 | 12/2014 | Barton et al. |
| 9,002,523 B2 | 4/2015 | Erickson et al. |
| 9,206,993 B2 | 12/2015 | Barton et al. |
| 9,442,500 B2 | 9/2016 | Nichols et al. |
| 9,488,994 B2 | 11/2016 | Zywicki et al. |
| 2001/0025349 A1 | 9/2001 | Sharood et al. |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0082746 A1 | 6/2002 | Schubring et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0171624 A1 | 11/2002 | Stecyk et al. |
| 2002/0173929 A1 | 11/2002 | Seigel |
| 2003/0000692 A1 | 1/2003 | Takaski et al. |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0070544 A1 | 4/2003 | Mulvaney et al. |
| 2003/0074489 A1 | 4/2003 | Steger et al. |
| 2003/0103075 A1 | 6/2003 | Rosselot |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennen |
| 2004/0193324 A1 | 3/2004 | Hoog et al. |
| 2004/0074978 A1 | 4/2004 | Rosen |
| 2004/0133314 A1 | 7/2004 | Ehlers et al. |
| 2004/0245352 A1 | 12/2004 | Smith |
| 2004/0262410 A1 | 12/2004 | Hull |
| 2005/0083168 A1 | 4/2005 | Beitenbach |
| 2005/0116055 A1 | 6/2005 | Alles |
| 2005/0270151 A1 | 12/2005 | Winick |
| 2006/0032379 A1 | 2/2006 | Kates |
| 2006/0071086 A1 | 4/2006 | Kates |
| 2006/0168342 A1 | 7/2006 | Budde et al. |
| 2006/0186213 A1 | 8/2006 | Carey et al. |
| 2006/0196953 A1 | 9/2006 | Simon et al. |
| 2006/0219799 A1 | 10/2006 | Schultz et al. |
| 2006/0242591 A1 | 10/2006 | Van Dok et al. |
| 2007/0013534 A1 | 1/2007 | DiMaggio |
| 2007/0029397 A1 | 2/2007 | Mueller et al. |
| 2007/0045429 A1 | 3/2007 | Chapman, Jr. et al. |
| 2007/0114291 A1* | 5/2007 | Pouchak ............ G05D 23/1905 236/44 C |
| 2007/0114293 A1 | 5/2007 | Gugenheim |
| 2007/0114295 A1 | 5/2007 | Jenkins |
| 2007/0277061 A1 | 11/2007 | Ashe |
| 2007/0278320 A1 | 12/2007 | Lunacek et al. |
| 2007/0289731 A1 | 12/2007 | Deligiannis et al. |
| 2008/0015740 A1 | 1/2008 | Osann, Jr. |

(56) References Cited

U.S. PATENT DOCUMENTS

| | | | |
|---|---|---|---|
| 2008/0134087 A1 | 6/2008 | Hoglund et al. | |
| 2009/0057424 A1 | 3/2009 | Sullivan et al. | |
| 2009/0140056 A1 | 6/2009 | Leen | |
| 2009/0140060 A1 | 6/2009 | Stoner et al. | |
| 2009/0140062 A1 | 6/2009 | Amundson et al. | |
| 2009/0140063 A1 | 6/2009 | Koster et al. | |
| 2009/0143879 A1 | 6/2009 | Amundsom et al. | |
| 2009/0143880 A1 | 6/2009 | Amundson et al. | |
| 2009/0143916 A1 | 6/2009 | Boll et al. | |
| 2009/0157529 A1 | 6/2009 | Ehlers et al. | |
| 2009/0165644 A1 | 7/2009 | Campbell | |
| 2009/0199212 A1 | 8/2009 | Schneider | |
| 2010/0008422 A1 | 1/2010 | Shimizu et al. | |
| 2010/0084482 A1 | 4/2010 | Kennedy et al. | |
| 2010/0102136 A1* | 4/2010 | Hadzidedic | F24F 11/77 |
| | | | 236/49.3 |
| 2010/0107112 A1 | 4/2010 | Jennings et al. | |
| 2010/0161574 A1 | 6/2010 | Davidson et al. | |
| 2010/0197238 A1 | 8/2010 | Pathuri et al. | |
| 2010/0204834 A1 | 8/2010 | Comerford et al. | |
| 2011/0061527 A1 | 3/2011 | Sullivan | |
| 2011/0078515 A1 | 3/2011 | Yasukawa | |
| 2011/0093424 A1 | 4/2011 | Zimmermann et al. | |
| 2011/0184563 A1 | 7/2011 | Foslien et al. | |
| 2011/0185895 A1 | 8/2011 | Freen | |
| 2012/0079425 A1 | 3/2012 | Grabinger et al. | |
| 2012/0318073 A1 | 12/2012 | Zavodny et al. | |
| 2012/0318135 A1 | 12/2012 | Hoglund et al. | |
| 2012/0318137 A1 | 12/2012 | Ragland et al. | |
| 2012/0318138 A1 | 12/2012 | Bisson et al. | |
| 2012/0319851 A1 | 12/2012 | Hoglund et al. | |
| 2012/0323374 A1 | 12/2012 | Dean-Hendricks et al. | |
| 2012/0323375 A1 | 12/2012 | Dean-Hendricks et al. | |
| 2012/0323377 A1 | 12/2012 | Hoglund et al. | |
| 2013/0158714 A1 | 6/2013 | Barton et al. | |
| 2013/0158715 A1 | 6/2013 | Barton et al. | |
| 2013/0158717 A1 | 6/2013 | Zywicki et al. | |
| 2013/0158718 A1 | 6/2013 | Barton et al. | |
| 2013/0158720 A1 | 6/2013 | Zywicki et al. | |
| 2013/0245838 A1 | 9/2013 | Zywicki et al. | |

FOREIGN PATENT DOCUMENTS

| | | |
|---|---|---|
| EP | 0434926 | 8/1995 |
| EP | 0678204 | 3/2000 |
| EP | 0985994 | 3/2000 |
| EP | 1033641 | 9/2000 |
| EP | 1074009 | 7/2001 |
| EP | 1143232 | 10/2001 |
| EP | 2138919 | 12/2009 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |
| WO | WO 02/23744 | 3/2002 |
| WO | WO 2010/021700 | 2/2010 |

OTHER PUBLICATIONS

"CorAccess Systems/In Home," http://web.archive.org/web2011212084427/www.coraccess.com/home.html, 1 page, copyright 2001, printed Aug. 19, 2004.
"HAI Company Background," http://www.homeauto.com/AboutHAI/abouthai_main.htm , 2 pages, printed Aug. 19, 2004.
"High-tech options take hold in new homes—Aug. 28, 200—Dallas Business Journal," http://bizjournals.com/dallas/stories/2000/08/28/focus4, 3 pages, dated Aug. 28, 2000, printed Aug. 19, 2004.
"Home Toys Review—TouchLinc," http://www.hometoys.com/htinews/aug99/reviews/touchline/touchline.htm, 3 pages, dated Aug. 1999, printed Aug. 20, 2004.
"HTI News Release," http://www.hometoys.com/htinews/apr99/releases/ha101.htm, 3 pages, Apr. 1999.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"RCS X10 Thermostat Plug-In for Home Seer Beta Version," 25 pages, Downloaded Sep. 9, 2011. 2.0.105.
"Spotlight on integrated systems," Custom Builder, V8, N2, p. 66(6), Mar.-Apr. 1993.
"Vantage Expands Controls for Audio/Video, HVAC and Security," http://www.hometoys/com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001; First Sale Feb. 2001.
AED Electronics, Inc., "Presenting Climatouch the Most Innovative Thermostat in the World!," 2 pages, prior to Nov. 30, 2007.
Andrews et al., "Clicky: User-Centric Input for Active Spaces," 17 pages, Aug. 2004.
Aprilaire Electronic Thermostats Models 8344, 8346, 8348, 8363, 8365, 8366 Operating Instructions, 8 pages, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr99/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Edge Performance Programmable Owner's Manual," 64 pages, 2007.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions pp. 1-12, Aug. 1999.

(56) References Cited

OTHER PUBLICATIONS

Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
U.S. Appl. No. 13/420,120, filed Mar. 14, 2012.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
DESA Heating Products, "Wireless Hand-Held Remote Control Sets Models (C) GHRCB and (C)GHRCTB, Operating Instructions," 4 pages, May 2003.
Domotique Secant Home Automation—Web Page, available at http://www.secant.ca/En/Company/Default.asp, 1 page, printed Sep. 28, 2004.
Emme Core User Guide, Version 1.1, 47 pages, Jan. 2011.
Firex Smoke Alarm, Ionization Models AD, ADC Photoelectric Model Pad, 4 pages, prior to Apr. 21, 2005.
Fluke, "561 HVAC Pro" Infrared Thermometer Users Manual, 22 pages, Downloaded May 24, 2012. 11-99.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Harris et al., "Optimizing Memory Transactions," Microsoft Research Havard University, 12 pages, May 25, 2012.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Installation Guide: Wireless Entry/Exit Remote," 12 pages, 2011.
Honeywell, Wireless Entry/Exit Remote, Operating Manual, 9 pages, 2011.
Honeywell, "Introduction of the 57350A Honeywell WebPAD Information Appliance," Home and Building Control Bulletin, 2 pages, Aug. 29, 2000; Picture of WebPAD Device with touch screen, 1 Page; and screen shots of WebPAD Device, 4 pages.
Honeywell, "RedLINK™ Wireless Comfort Systems," RedLINK Wireless Technology, 8 pages, Aug. 2011. 50-1194 PR.
Honeywell, "Total Connect Online Help Guide," Revision A, 800-02577-TC, Mar. 2010.
Honeywell, "Total Connect User Guide," Revision B, 34 pages, May 15, 2012. K14741.
Honeywell, "VisionPRO® 8000 Thermostats," Honeywell International Inc., 2 pages, Downloaded May 24, 2012. http://yourhome.honeywell.com.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html , Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
http://hunter-thermostats.com/hunter_programmable_thermostats.html, Hunter Thermostat 44668 Specifications, and 44758 Specifications, 2 pages, Printed Jul. 13, 2011.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Model 44758 Remote Sensor," Owner's Manual, 2 pages, Revision Sep. 4, 2008. Form No. 44044-01.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Larsson, "Battery Supervision in Telephone Exchanges," Ericsson Components AB Sweden, 5 pages, Downloaded May 5, 2012. 9.14.
Lennox, "Network Control Panel (NCP)," User's Manual, 18 pages, Nov. 1999.
Lennox, "Prodigy Control System," Lennox Industries, 4 pages, May 25, 2012. (63W21)-01/11.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "9000RF Remote Instructions," 2 pages, prior to Nov. 30, 2007.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
METASYS, "HVAC PRO for Windows User's Manual," 308 pages, 1998.
Mounting Template for Ritetemp Thermostat 8082, 1 page, 2002.
OMRON Electronic Components, LLC, "Micro Tilt Sensor D6B," Cat. No. JB301-E3-01, 6 pages, Mar. 2005.
OMRON Electronic Components, LLC, "Micro Tilt Sensor D6B," Cat. No. B02WAD1, 2 pages, Jun. 2002.

(56) References Cited

OTHER PUBLICATIONS

Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Saravanan et al, "Reconfigurable Wireless Interface for Networking Sensors," IJCSNS International Journal of Computer Science and Network Security, vol. 8 No. 7, pp. 270-276. Revised Jul. 20, 2008.
Screenshot of http://lagotek.com/index.html?currentSection=TouchIt, Lagotek, 1 page, prior to Mar. 29, 2012.
Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
SmartAC, "Thermostat Programming Web Site Guide," PG-WC-7E, 2 pages, 2009.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "P/N P374-0431 Thermostat Remote Control and Receiver," Owner's Manual, 11 pages, prior to Nov. 30, 2007.
Totaline, "P474-1100RF, P474-1100REC Wireless Thermostat," 1 page, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Wireless Remote Sensor, Model P474-0401-1RF/REC," 2 pages, prior to Nov. 30, 2007.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trane, "Wireless Zone Sensor. Where Will Wireless Technology Take You?," 4 pages, Feb. 2006.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior Jul. 7, 2004.
www.icmcontrols.com, Simplecomfort, SC3006 Single Stage Heat/Single Stage Cool or Single Stage Heat Pump/Manual Changeover, 1 page, prior Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
Prosecution History from U.S. Appl. No. 13/326,553 dated Apr. 1, 2014 through Jun. 20, 2017, 300 pp.

\* cited by examiner

HVAC CONTROLLER WITH PERFORMANCE LOG

This is a continuation of co-pending U.S. patent application Ser. No. 13/326,553, filed Dec. 15, 2011, which is incorporated herein by reference.

TECHNICAL FIELD

This disclosure relates generally to HVAC systems, and more particularly, to HVAC controllers that may be used for controlling HVAC systems.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Over time, the HVAC system may begin to operate less efficiently. Diagnosing the cause of the loss in system efficiency may be difficult. Diagnostics may be employed to assist in monitoring the performance of an HVAC system over time.

SUMMARY

This disclosure relates generally to HVAC systems, and more particularly, to HVAC controllers that may be used for controlling HVAC systems.

In some illustrative embodiments, an HVAC controller may be configured to log and record performance parameter data related to the performance of a connected HVAC system over a period of time. The performance parameter data related may be written to a performance log that is stored in a memory of the HVAC controller. In some instances, the HVAC controller may receive a first user request via the user interface, and in response, retrieve at least some of the performance related data from the performance log that corresponds to a first selected subset of the period of time, and display at least some of the retrieved performance parameter data on a display of the HVAC controller.

In some cases, the HVAC controller may receive a second user request via the user interface and, in response, retrieve at least some of the performance parameter data from the performance log that corresponds to a second selected subset of the period of time, and display at least some of the retrieved performance parameter data on the display of the HVAC controller. In some cases, the second subset of the period of time may be longer that the first subset of the period of time.

In some instances, and to reduce the storage requirement for the performance parameter data, the HVAC controller may only store a minimum and/or a maximum value over a specified period of time for each of the one or more different performance parameters, but this is not required. Also, and in some instances, it is contemplated that the HVAC controller may automatically change a format of the performance parameter data that is displayed on the display of the HVAC controller based on a current setup configuration of the connected HVAC system.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
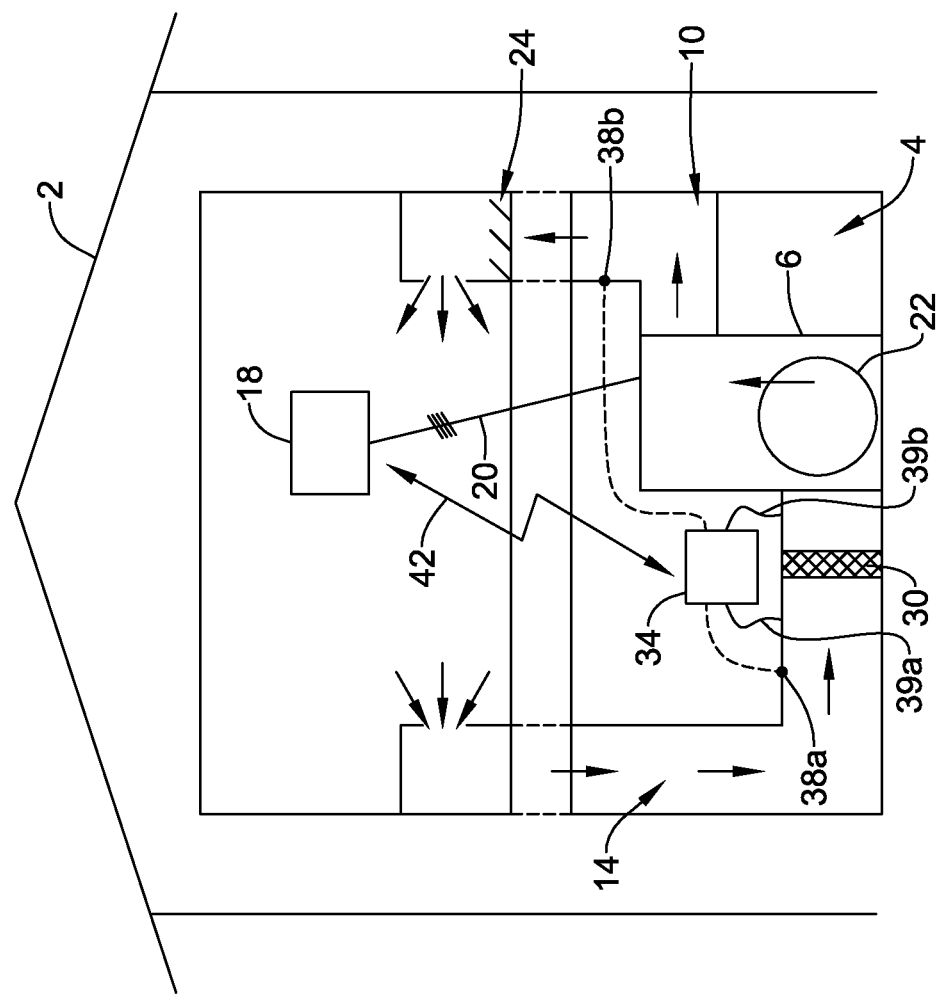
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several embodiments which are meant to illustrative of the claimed disclosure.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4. For example, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In some cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
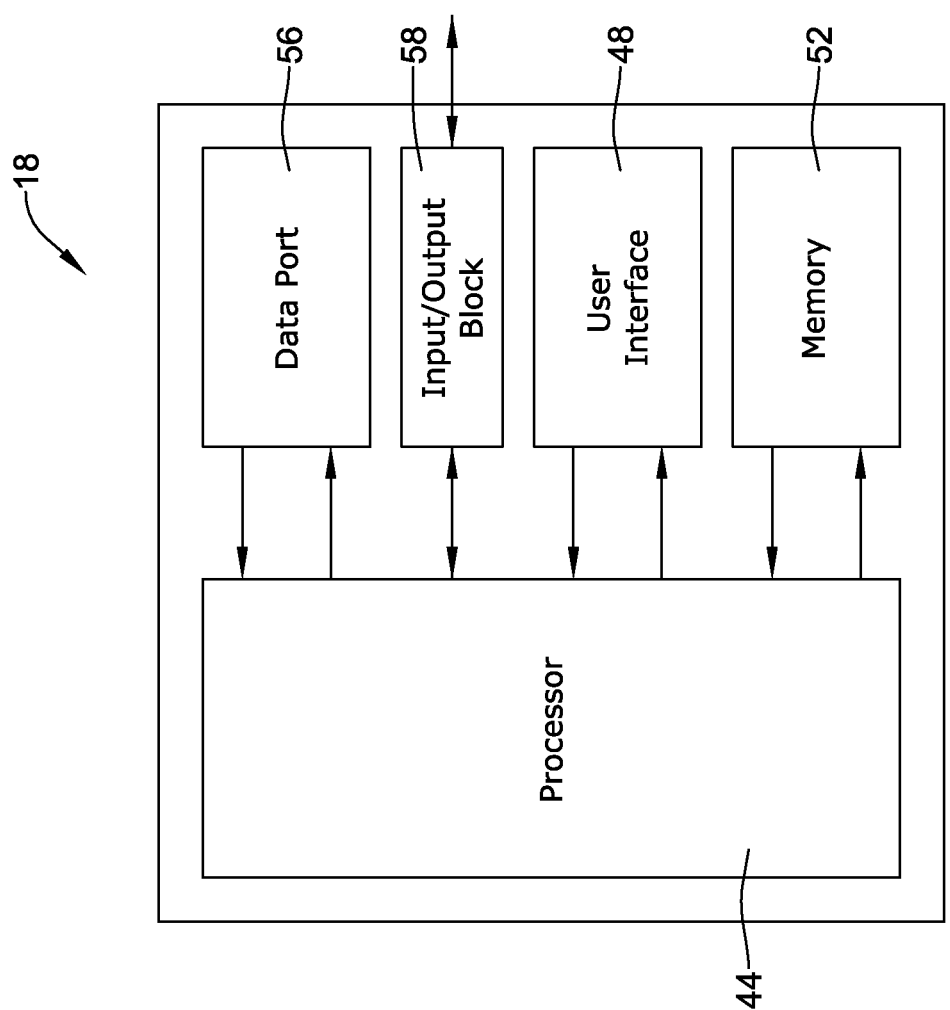
FIG. 2 is a schematic view of an illustrative HVAC controller.

FIG. 2 is a schematic view of an illustrative HVAC controller 18. In some instances, HVAC controller 18 may be a thermostat, but this is not required. In the illustrative embodiment of FIG. 2, HVAC controller 18 includes a processor (e.g. microprocessor, microcontroller, etc.) 44, a memory 52 and user interface 48 including a display. In some cases, the HVAC controller 18 may optionally include an input/output block (I/O block) 58 for receiving one or more signals from the HVAC system and/or for providing one or more control signals to the HVAC system. The I/O block 58 may communicate with one or more HVAC components 6 of the HVAC system 4. Alternatively, or in addition, the I/O block 58 may communicate with another controller, which is in communication with one or more HVAC components 6 of the HVAC system 4, such as a zone panel in a zoned HVAC system.

In the illustrative embodiment of FIG. 2, user interface 48 may be any suitable use interface that permits HVAC controller 18 to display and/or solicit information, as well as accept one or more user interactions with the HVAC controller 18. For example, the user interface 48 may permit a user to enter data such as temperature set points, humidity set points, starting times, ending times, diagnostic limits, conditions under which diagnostic limits may be suspended, responses to alerts, and the like. In some cases, user interface 48 may include a display and a distinct keypad. A display may be any suitable display. In some instances, a display may include or may be a liquid crystal display (LCD), and in some cases a fixed segment display or a dot matrix LCD display. If desired, user interface 48 may be a touch screen LCD panel that functions as both display and keypad. In some instances, a touch screen LCD panel may be adapted to solicit values for a number of operating parameters and/or to receive such values, but this is not required.

The processor 44 may operate in accordance with an algorithm that controls or at least partially controls one or more HVAC components 6 of an HVAC system such as, for example, HVAC system 4 shown in FIG. 1. The processor 44 may, for example, operate in accordance with an algorithm that provides temperature set points, starting and/or ending times, and the like. In some cases, HVAC controller 18 may include a timer (not shown). The timer may be integral to the processor 44 or may be provided as a separate component.

In some cases, the processor 44 may be programmed to receive one or more signals related to a current performance of the HVAC system from the HVAC system, either directly or via the I/O block 58. The one or more signals received by the processor 44 from the HVAC system 4 may be indicative of one or more performance parameters that may be used to characterize the performance of the HVAC system 4. For example, the one or more signals may be indicative of the total run time since installation of the HVAC system 4, the total run time for a selected time period, the number of heating or cooling cycles completed since installation of the HVAC system 4, the number of heating or cooling cycles during a selected time period, the maximum and minimum indoor air temperature, the maximum and minimum outdoor air temperature, the maximum and minimum indoor humidity, the maximum and minimum outdoor humidity, the maximum and minimum discharge air temperature, the maximum and minimum delta T, and/or the like. These are just some examples.

The processor 44 may receive and record data related to any combination of those performance parameters listed above, as well as other parameters as desired. For example, in some cases, the processor 44 may receive and record parameter data relating to two different performance parameters such as an indoor air temperature and an indoor humidity, an outdoor temperature and an outdoor humidity, a discharge air temperature and a delta T, but these are just examples. Additionally, it is useful to note that the data that is received and subsequently recorded by the processor 44 may be dependent upon the type of HVAC equipment installed. For example, if the HVAC system 4 does not include an outdoor air temperature sensor, data related to the outdoor air temperature may not be recorded by the processor 44 in the memory 52.

In some cases, the processor 44 may be configured to store data related to the performance of the HVAC system over a period of time. The performance data may be logged and recorded in one or more performance data logs stored in the HVAC controller memory 52. In some cases, heating performance data corresponding to the heating mode of the HVAC system 4 may be stored in a heating performance log, and cooling performance data corresponding to the cooling mode of the HVAC system 4 may be stored in a cooling performance log. In some cases, the heating performance log and the cooling performance log may be recorded in separate data logs in the HVAC controller memory 52, but this is not required. In other cases, the heating performance log and the cooling performance log may be combined into a single HVAC system performance data log. In such instances, the heating performance data may be displayed and viewed separately from the cooling performance data when desired, but this is not required. The performance data log(s) may be displayed on a display of the user interface 48 in response to a request initiated by a user, or may be downloaded to a remote device for viewing and/or analysis. In many cases, the heating and the cooling performance data logs may be similar to one another. As such, the heating and cooling performance logs may be described together, and may simply be referred to herein as performance data logs.

In some cases, the processor 44 may be configured to log and record performance data related to the performance of the HVAC system for a period of time of: up to about five years; of up to about three years; of up to about two years; of up to about one year, or more or less. As discussed above, the performance data may be logged and recorded in a performance data log (heating, cooling, and/or combined) stored in the HVAC controller memory 52. In some cases, the processor 44 may be programmed to group performance data into one or more subsets of data according to, for example, various time periods. For example, the processor 44 may be programmed to group, classify or sort performance data stored in the performance data logs into data subsets corresponding to a one hour period, a one day period, a one week period, a one month period, a three month period, a six month period, a one year period, an eighteen month period, a two year period, and/or any other suitable time period(s). Grouping the performance related data into subsets according to various different time periods may allow the performance related data to be more easily sorted, classified and/or viewed according to one or more of the selected time periods. Additionally, data subsets corresponding to shorter periods of time (e.g. a minute, an hour, a day, a week, etc.) may be used to provide a more contemporary view the most recently collected performance related data. Data subsets corresponding to longer periods of time (e.g. a month, a three month period, a six month period, a year period, etc.) may be used to provide a more long term, historical view of the collected performance related data.

The processor 44 may be configured to record and log performance related data on a second, minute, hourly, daily, weekly, monthly, yearly, or any other suitable basis. In one specific example, the processor 44 may be configured to record and log performance related data on an hourly basis for the most recent 192 hours, on a daily basis for the most recent fifteen days, on a weekly basis for the most recent eight weeks, and on a monthly basis for the most recent twenty-five months. In some cases, the amount of data entries that may be logged and recorded on an hourly, daily, weekly, monthly and/or yearly basis by the processor 44 may only be limited by the capacity of the controller memory 52.

To help conserve memory, the processor 44 may be programmed to record and log only the minimum and maximum values for each of the performance related parameters being monitored during the corresponding time period. For example, each data log entry logged and recorded at the end of an hour period of time may include only the minimum and maximum values detected during the hour period for the indoor air temperature, the outdoor air temperature, the indoor humidity, the outdoor humidity, the discharge air temperature, the delta T, and/or the like, as applicable. Also, each data log entry logged and recorded at the end of a daily time period may include only the minimum and maximum values detected during the daily time period for the indoor air temperature, the outdoor air temperature, the indoor humidity, the outdoor humidity, the discharge air temperature, the delta T, and/or the like, as applicable.

Additionally, the data log entry may record the total run time of the HVAC system 4 since installation, the total run time for each time period, the number of heating or cooling cycles completed since installation of the HVAC system, the number of heating or cooling cycles during each time period, as applicable. In some cases, each data log entry logged and recorded by the processor 44 may include a date and time stamp. The date and time stamp may be provided by the processor according to the date and time when the data log entry was recorded. In some cases, an HVAC cycle number count may be used in addition to, or in lieu of, a date and time stamp.

When the shortest time period corresponds to an hour, the content of the performance data logs may be updated on an hourly basis at the end of every sixty minute period as determined by an internal clock or timer provided with the processor 44. The internal clock or timer may be integral with the processor 44 or may be provided as a separate component. In some cases, when the amount of data log entries exceeds the capacity of the data log, the oldest data log entry may be removed from the performance data log before a new data log entry is recorded (First-In-First-Out). The oldest data log entry may be the oldest entry that was created for a selected period of time. For example, at the end of every hour a new data log entry may be recorded. If there are 192 hourly data entries previously recorded in the hourly data log before the new data log entry is made, the oldest created hourly data log entry may be removed. Similarly, at the end of every hour, the processor 44 may be programmed to compare the day of the current time and date stamp to the current daily data log entry. If the days are different, a new daily log entry may be created. In some cases, this may cause the processor 44 to remove the oldest daily log entry from the performance data log.

The processor 44 may be further programmed to compare the week of the current date and time stamp to the week of the currently weekly entry and, if the weeks are different, a new weekly data log entry may be added to the performance data log. As a result, in some cases, the oldest weekly data log entry may be removed from the performance data log. The processor 44 may also be programmed to compare the month of the current time date and time stamp to the month of the current monthly data log entry. If the months differ, the processor 44 may be programmed to add a new monthly data log entry. In some cases, the oldest monthly log entry may be removed. These time periods are only illustrative. Also, in some cases, only the minimum and maximum values may be stored for each time period, which may help conserve memory space within memory 52.

In some cases, the processor 44 also may be configured to monitor one or more signals from the HVAC system 4 to determine whether or not the HVAC system 4 has violated a pre-determined diagnostic limit for a selected parameter stored in the HVAC controller memory 52. In some cases, for example, the processor 44 may monitor one or more signals to/from the HVAC system 4 to determine whether or not the HVAC system has violated a pre-determined delta T limit in either the heating and/or cooling mode. A violation of a pre-determined diagnostic limit such as, for example, a delta T limit may occur if, for example, the HVAC system 4 fails to reach a minimum delta T limit or exceeds a maximum delta T limit. Additionally, a violation may occur if, for example, the HVAC system 4 fails to meet or exceed a minimum delta T limit within a pre-determined period of time. These are just some examples. The diagnostic limits and the conditions for violating a diagnostic limit may be dependent upon the HVAC system set-up, the number and type of HVAC components 6 included in the HVAC system 4, whether or not the HVAC system 4 is subject to a utility load shutoff, user preferences, user specified conditions for determining a diagnostic fault, and the like.

In many cases, when a diagnostic limit has been violated, the processor 44 may be configured to indicate to the user that a diagnostic fault has occurred. This may be accomplished in a variety of ways. For example, if the processor 44 has determined that a diagnostic limit has been violated, and a diagnostic fault has occurred, the processor 44 may display a user alert on a display of the user interface 48. In some cases, the processor 44 may be programmed to alert the user to a diagnostic fault only after a pre-determined number of faults are detected by the processor 44. In some cases, the user alert may be a simple text string displayed on the display of the user interface 48 describing the nature of the violation that has occurred. In other instances, the processor 44 may provide some visual indication to alert the user that a fault has occurred. Such visual indication may include a colored, flashing, highlighted, or grayed-out button or icon provided on the user interface 48. In still other instances, the processor 44 may be configured to send an email, instant message, or text message to a user to alert the user that a fault has occurred. Such an alert may be provided to the user even when the user is away from the home, building, or other structure in which the HVAC system 4 is installed.

Memory 52 of the illustrative HVAC controller 18 may be in communication with the processor 44. Memory 52 may be any suitable type of storage device including, but not limited to, RAM, ROM, EPROM, flash memory, a hard drive, and/or the like. In some cases, processor 44 may store information within memory 52, and may subsequently retrieve the stored information. Memory 52 may be used to store any desired information, such as control algorithms, set points, diagnostic limits such as, for example, differential pressure limits, delta T limits, and the like, for the HVAC controller 18. As eluded to above, memory 52 may also be used to store performance data related to the performance of the HVAC system 4 in one or more performance logs. The performance data may be stored in the memory 52 such that it may be retrieved from the memory upon request. In some cases, the performance data may be stored in the memory 52 such that at least one subset of the data may be retrieved from the memory in response to a request from a user.

In some cases, HVAC controller 18 may also include a data port 56. Data port 56 may be a wireless port such as a Bluetooth™ port or any other wireless protocol. In other cases, data port 56 may be a wired port such as a serial port, a parallel port, a CAT5 port, a USB (universal serial bus) port, or the like. In some instances, data port 56 may be a USB port and may be used to download and/or upload information from a USB flash drive. Other remote devices may also be employed, as desired.

Data port 56 may be configured to communicate with processor 44 and may, if desired, be used to either upload information to processor 44 or to download information from processor 44. Information that can be uploaded or downloaded may include values of operating parameters. In some instances, data port 56 may be used to upload a previously-created thermostat configuration into HVAC controller 18, thereby hastening the programming process. In some cases, data port 56 may be used to download a thermostat configuration that has been created using HVAC controller 18, so that the thermostat configuration may be transferred to other similar thermostats. In some cases, data port 56 may be used to upload and/or download information pertaining to an HVAC dealer or contractor.

In some cases, data port 56 may be used to download data stored within the memory 52 for analysis. For example, data port 56 may be used to download a performance data log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD® file, text, or XML file, but this is not required.

Figure 3:
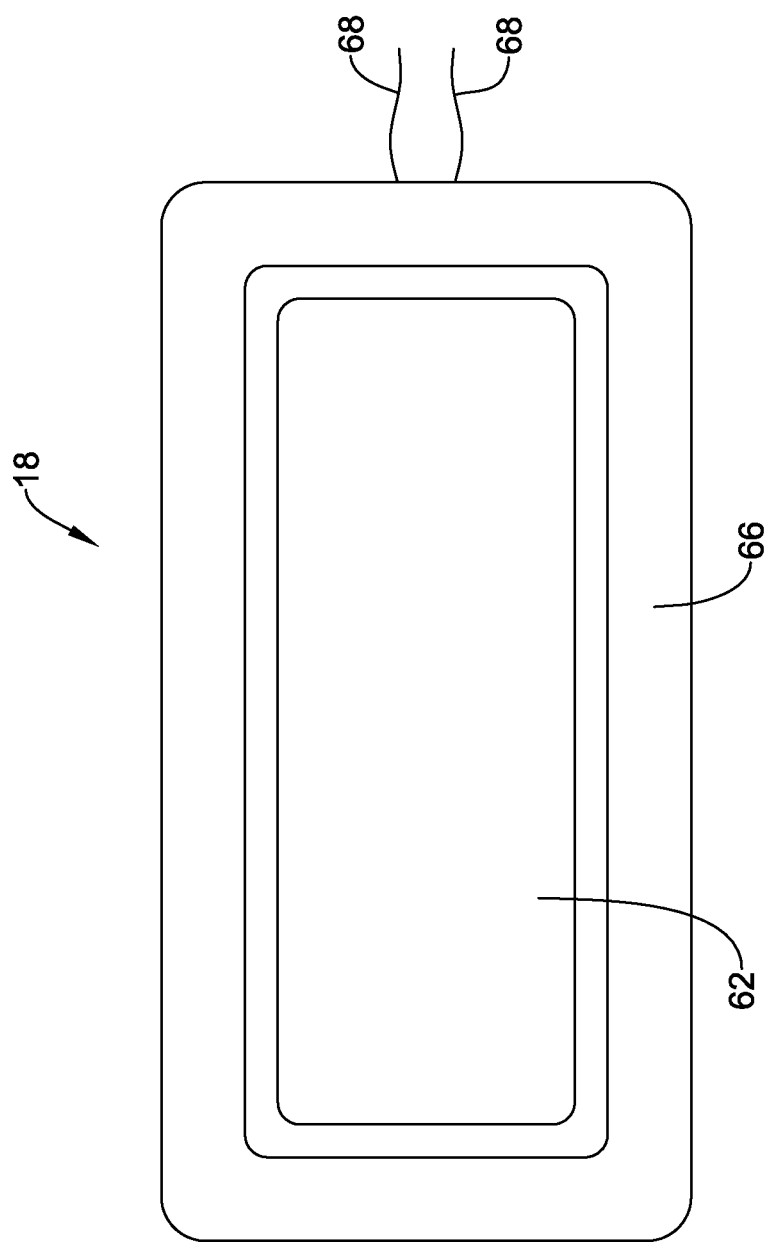
FIG. 3 is a front view of an illustrative HVAC controller.

FIG. 3 is a front view of an illustrative HVAC controller 18 that has a user interface 48 that includes a display 62 disposed within a housing 66 but viewable from external to the housing 66. In some cases, display 62 may be a touch screen LCD display. If desired, display 62 may be a dot matrix touch screen LCD display. A dot matrix touch screen LCD display is a touch screen LCD that permits images such as letters, numbers, graphics, and the like to be displayed anywhere on the LCD, rather than being confined to predetermined locations such as is the case with a fixed segment LCD display. Housing 66 may be formed of any suitable material, such as a polymeric material. In some cases, the housing 66 may be formed such that it defines a data port 56 (see FIG. 2). The housing 66 may also include suitable wiring and/or other electrical connections 68 such that the HVAC controller 18 may be electrically coupled to the HVAC system 4.

Figure 4:
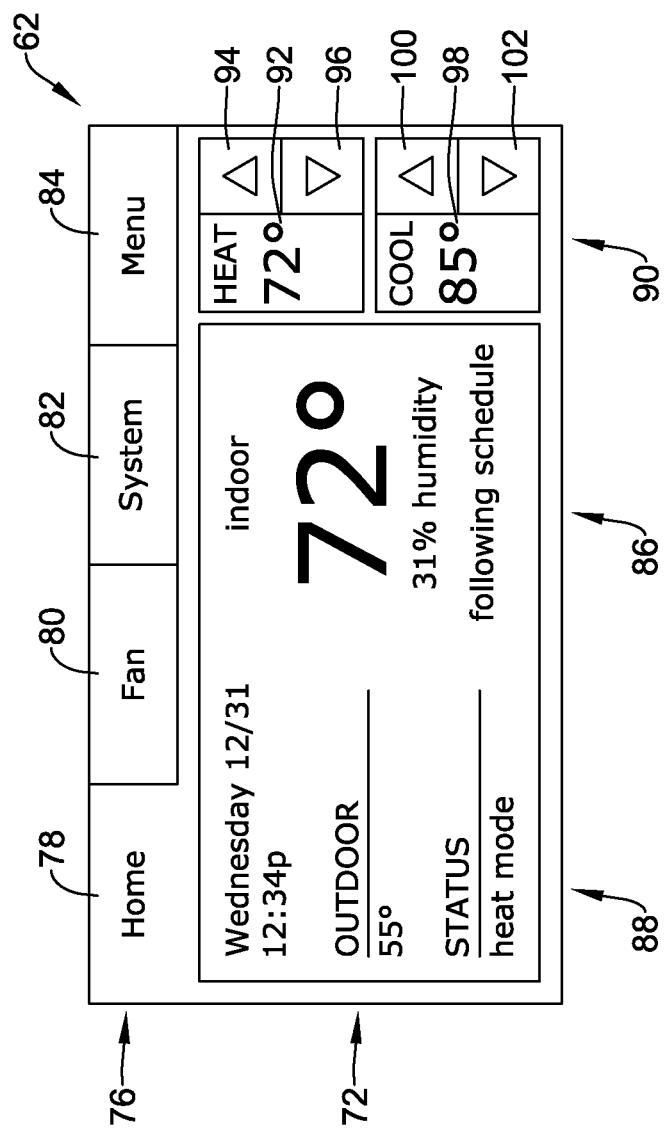
FIG. 4 provides an illustrative example of a home screen that may be displayed upon the HVAC controllers of FIGS. 2 and 3.
Figure 5:
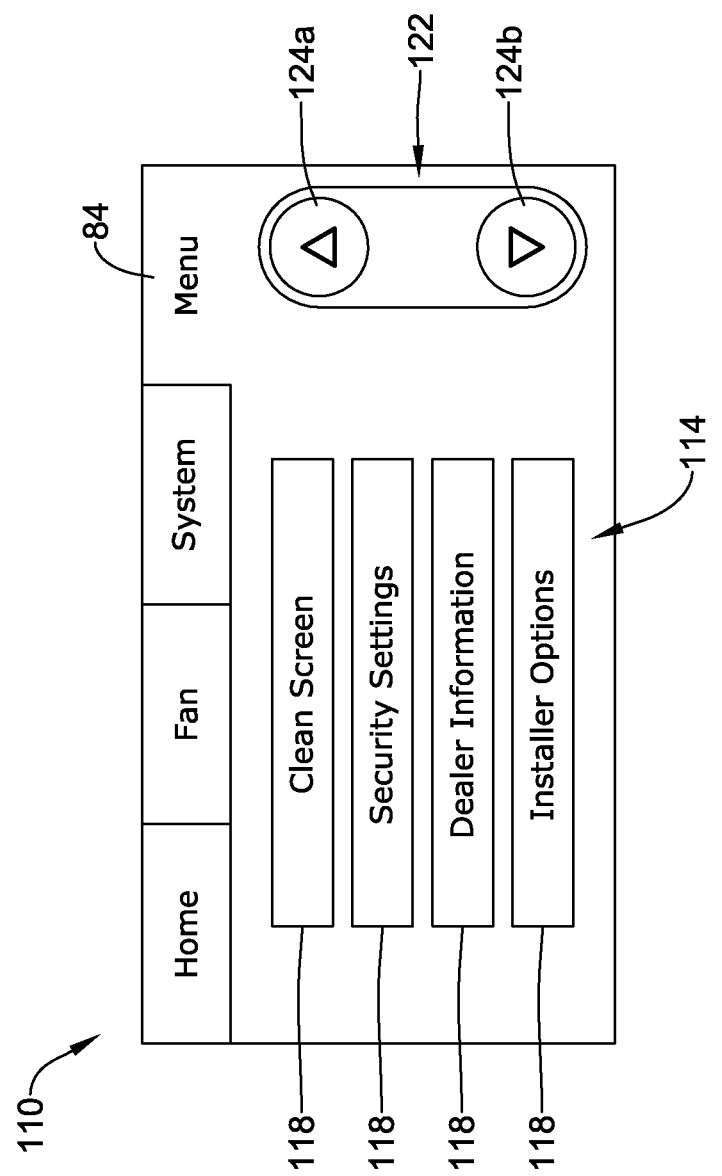
FIGS. 5-23 provide several illustrative examples of screens that may be displayed upon the HVAC controllers of FIGS. 2 and 3 when in use.

In some cases, HVAC controller 18 may be configured to provide substantial display and/or programming functionality, but this is not required. In some cases, HVAC controller 18 may be configured to display a default display, referred to herein as a home screen, which is displayed by HVAC controller 18 when no other data entry is underway for a period of time. FIG. 4 provides an example home screen 72 that may be displayed by HVAC controller 18. In some cases, home screens may include screens that can be accessed by a top level navigational menu. A home screen may, if desired, display one or more parameters relating to environmental conditions such as indoor and/or outdoor air temperature and/or humidity, expected weather conditions, and/or the status of equipment that is at least partially controlled by HVAC controller 18.

The illustrative home screen 72 shown in FIG. 4 includes a navigational bar 76 along the top. Navigational bar 76 may be considered as providing top level navigation, but this is not required. In some cases, if desired, navigational bar 76 may include one or more of a HOME button 78, a FAN button 80, a SYSTEM button 82 and/or a MENU button 84. FIG. 4 is an example of a screen that may be displayed after a user has pushed HOME button 78, or when no other data entry is underway for a period of time. Additionally, through home screen 72, the user may access one or menus from which the user may make a temperature set point change, a humidity set point change, an indoor air quality change, a programmable schedule change, a system mode change, a fan setting change, an installer setting change, among others. Such changes may be considered a user interaction.

In some cases, illustrative home screen 72 may be considered as having two or more regions. For example, home screen 72 may include a first region 86 and a second region 88. In some instances, first region 86 may be considered as displaying or otherwise providing primary information, while second region 88 may be considered as displaying or otherwise providing secondary information. In some cases, primary information may be information that is considered to be more important, more interesting and/or more useful than secondary information. To illustrate, first region 86 may display one or more of a current air temperature reading, a current indoor humidity, a schedule status, and the like. Second region 88 may display one or more of a date and time, an outdoor air temperature reading, an outdoor humidity reading, an equipment status, and the like.

Home screen 72 may also include a third region 90 that may be used for displaying and/or adjusting a set point value. In the example shown, third region 90 may display a first parameter 92, a first up arrow 94 and a first down arrow 96. Third region 90 may also display a second parameter 98, a second up arrow 100 and a second down arrow 102. First parameter 92 may be adjusted up or down by a user using first up arrow 94 and/or first down arrow 96, as appropriate. Second parameter 98 may be adjusted up or down by a user using second up arrow 100 and/or second down arrow 102, as desired. In some cases, third region 90 may, as illustrated, display both a heating temperature set point and a cooling temperature set point, but this is not required.

FIGS. 5-14 show illustrative screens that may be displayed when a contractor or other user is attempting to access a performance log stored in the memory 52 of the HVAC controller 18. Selecting the MENU button 84 on home screen 72 of FIG. 4 may cause the menu screen 110 of FIG. 5 to be displayed. The illustrative menu screen 110 may include a table 114 that has one or more selectable menu options 118 that may be selected by a user. In some cases, the table 114 may be a scrolling table, in which case the menu screen 110 may also include a scroll bar 122 including first and second arrows 124a, 124b that may facilitate a user in scrolling through the available menu options 118.

Figure 6:
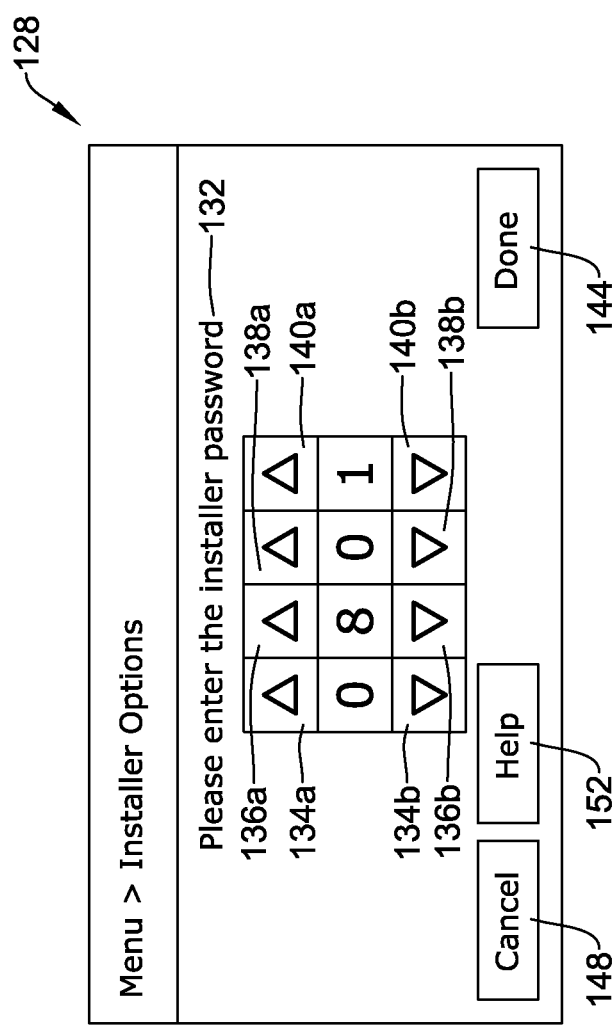

Upon selection of the INSTALLER OPTIONS menu options 118, the illustrative HVAC controller 18 may be configured to display a password prompt screen 128, as illustrated in FIG. 6. The password prompt screen 128 may include a user prompt 132 that may prompt the user to enter a user login ID, which may include a user name and/or password. In some cases, certain rights may be associated with different user login IDs or passwords. For example, a homeowner may have a different login ID and different user rights than an HVAC contractor. The user login ID and/or password may include any combination of alphanumeric characters. In one example, as illustrated in FIG. 6, the password may be a sequence of numbers. The sequence of numbers may be adjusted to the correct sequence using corresponding arrow keys. The user may then select the DONE button 144 to confirm entry of the password. In some cases, the password prompt screen 128 may include a CANCEL button 148, which upon its selection may cancel the user's current actions and return the user to the previous screen, such as the menu screen 110 of FIG. 5. In some cases, the password prompt screen 128 may include a HELP button 152. Selection of the HELP button 152 may cause the HVAC controller 18 to display additional information about the use of the currently displayed screen. Sometimes this information screen may appear on an additional screen or a pop-up screen that overlays the current screen, but this is not required.

Figure 7:
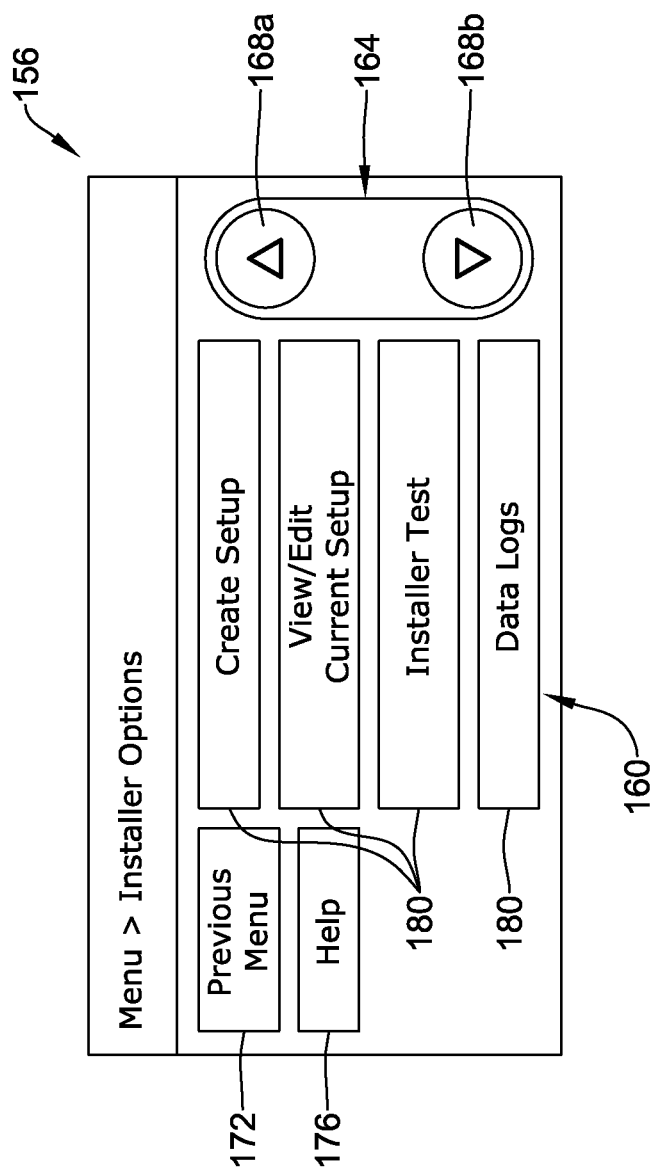

Upon selection of the DONE button 144 confirming entry of a password, the HVAC controller 18 may confirm that a valid password has been entered. If a valid password has been entered, the HVAC controller 18 may display an installer options menu screen 156, such as illustrated in FIG. 7. Like the previous menu screen 110, the installer options menu screen 156 may include a table 160 including one or more installer options. In some cases, the table 160 may be a scrolling table, in which case the installer options menu screen 156 may also include a scroll bar 164 having first and second arrows 168a, 168b that may facilitate a user to scroll through and view the available installer options presented in table 160. The installer options menu screen 156 may also include a BACK button or PREVIOUS MENU button 172 which, when selected, may cause menu screen 110 of FIG. 5 to be displayed. Additionally, in some cases, the installer options menu screen may include a HELP button 176, which when selected, may cause additional information pertaining to the use of the currently displayed screen to be displayed.

Figure 8:
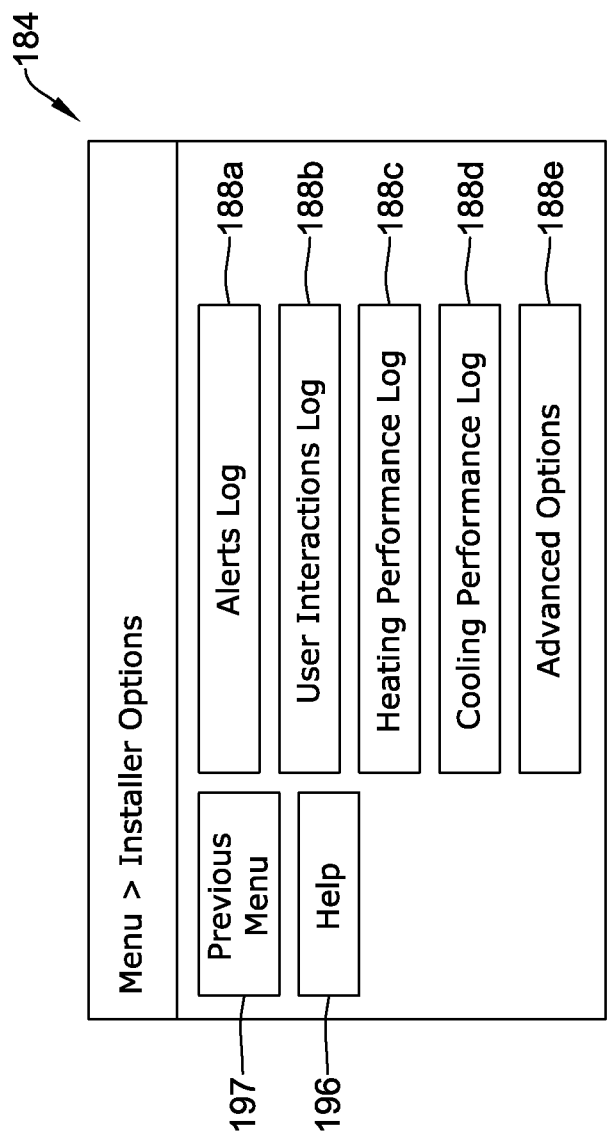

In the example shown, the table 160 includes a number of installer options 180 that may be selected by the user. In some cases, a DATA LOGS option 180 may be provided, which may provide access to a performance data log stored in the HVAC controller memory 52. In some instances, selection of the DATA LOGS option 180 may cause a data logs menu screen 184 to be displayed by the HVAC controller 18, as shown in FIG. 8. The data logs menu screen 184 may display one or more data log options 188a-188e that may be selected by the user. The data logs menu screen 184 may include a back button or a PREVIOUS MENU button 197, which when selected, may return the user to the installer options menu screen 156 illustrated in FIG. 7. The data logs menu screen 184 may include a HELP button 196, which when selected, may cause additional information pertaining to the use of the currently displayed screen to be displayed.

In the example shown, a user may select either performance log option 188c or 188d to access a performance data log stored in the HVAC controller memory 52. For example, a user may select the COOLING PERFORMANCE LOG option 188d to access a cooling performance log stored in the HVAC controller memory 52. In some instances, upon selection of the COOLING PERFORMANCE LOG option 188d, the HVAC controller 18 may retrieve at least some of the cooling performance data stored in the memory 52 and display the cooling performance data via one or more screens such as, for example, screens 200, 202, 204, 206 as shown in the illustrative examples provided by FIGS. 9-12.

Figure 10:
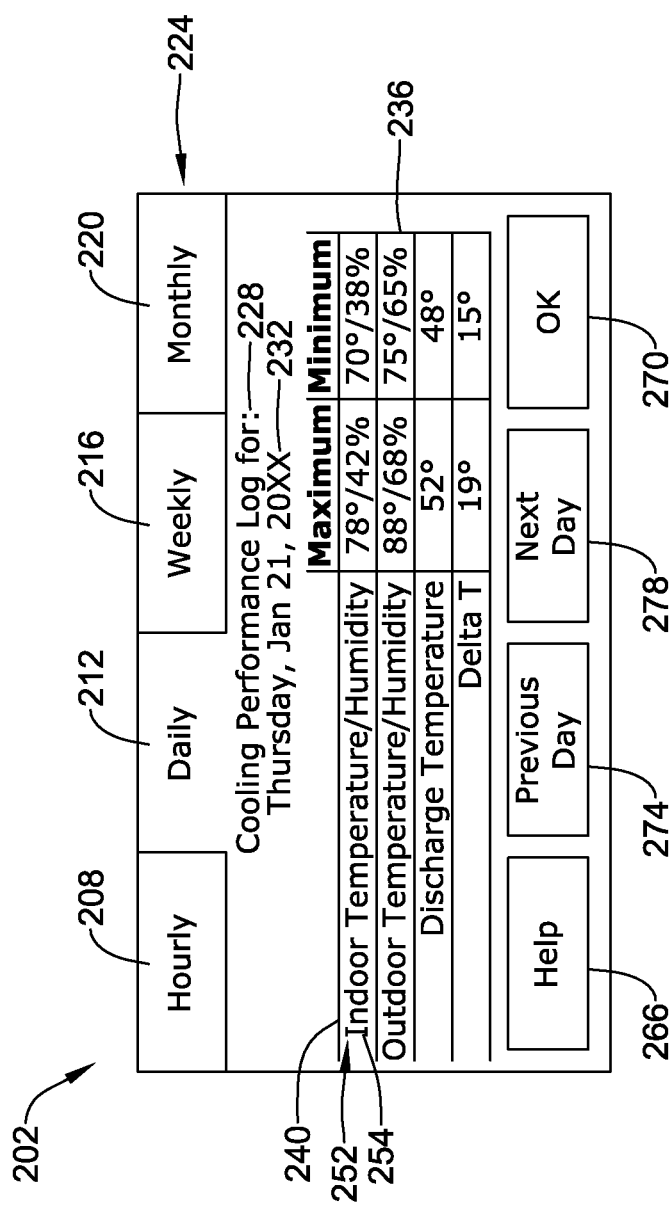
Figure 11:
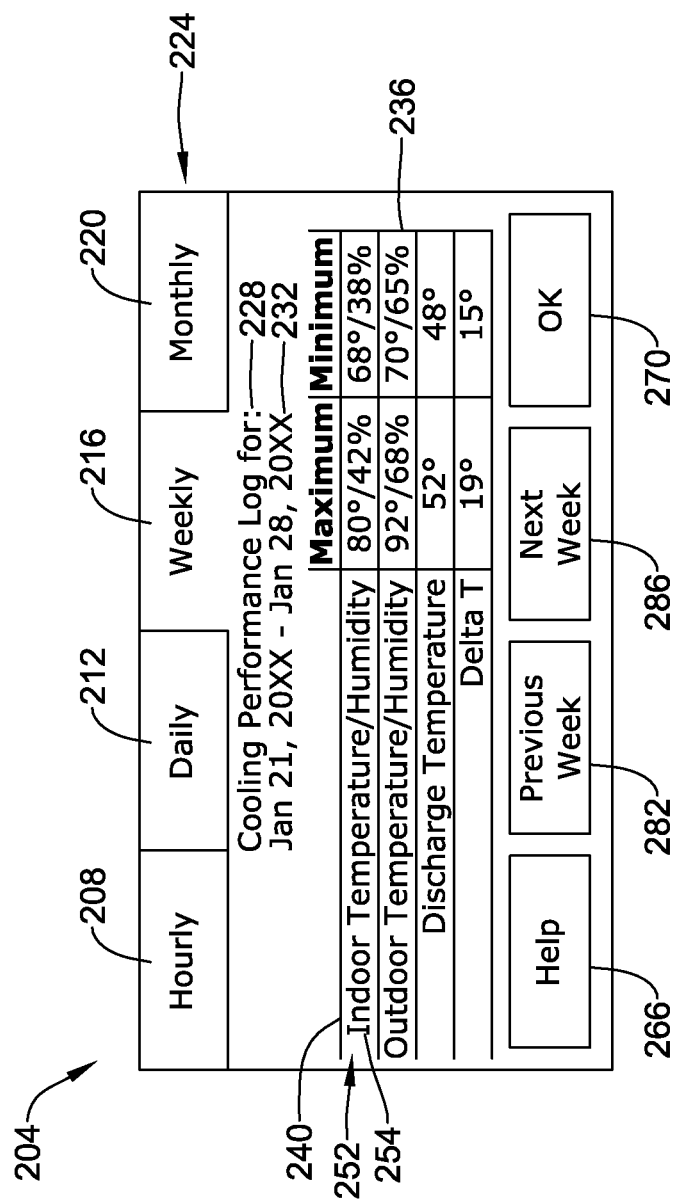
Figure 12:
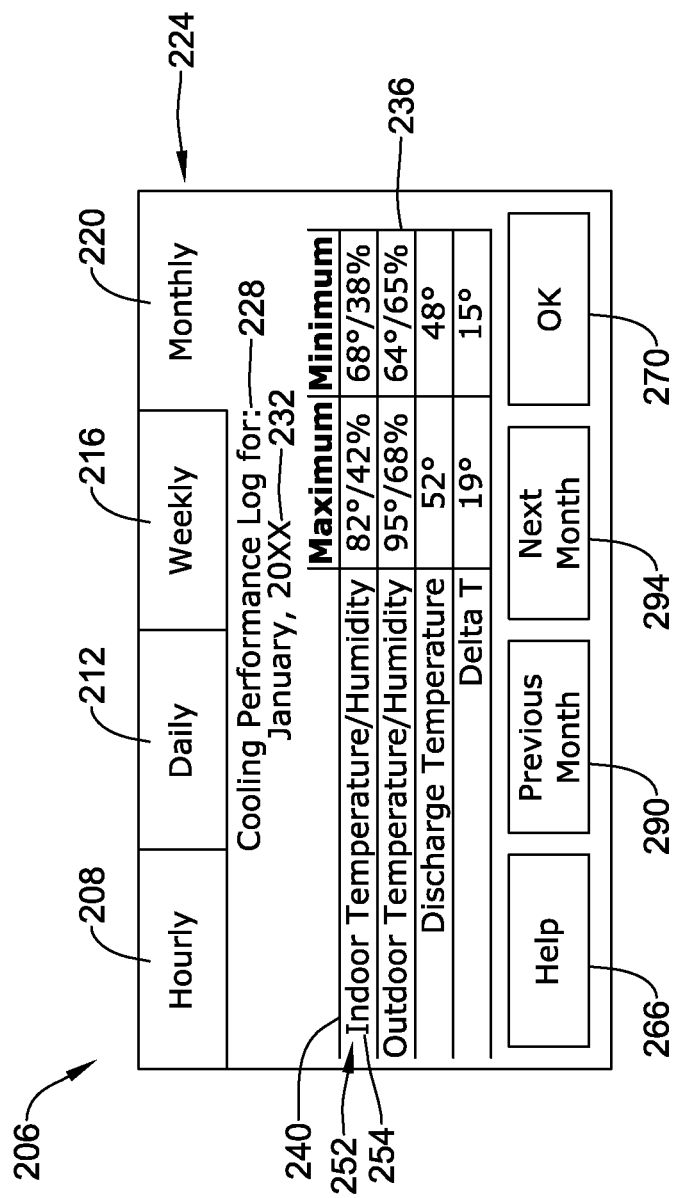

Tabs or buttons 208, 212, 216, and 220 shown in FIGS. 9-12 each correspond to a subset of data for a selected period of time (e.g. hourly, daily, weekly, monthly). A user may select a tab or button 208, 212, 216 or 220 that corresponds to the subset of cooling performance data for which the user desires to view. In some cases, this may include a first user request selecting tab 208, a second user request selecting tab 212, a third user request selecting tab 216, and a fourth user request selecting tab 220. The user may be free to select any of tabs 208, 212, 216 or 220 in any order. In one example, a user may select: the HOURLY tab 208 (see FIG. 9) to view the most recent cooling performance data on an hourly basis (FIG. 9); the DAILY tab 212 to review the most recent cooling performance data on a daily basis (FIG. 10); the WEEKLY tab 216 to review cooling performance data on a weekly basis (FIG. 11); and/or the MONTHLY tab 220 to review cooling performance data on monthly basis (FIG. 12). In some cases, and to help reduce the amount of performance parameter data that must be stored in memory 52, only maximum and/or minimum values may be stored in the performance log, and then subsequently displayed on screens 200, 202, 204 and 206.

Figure 9:
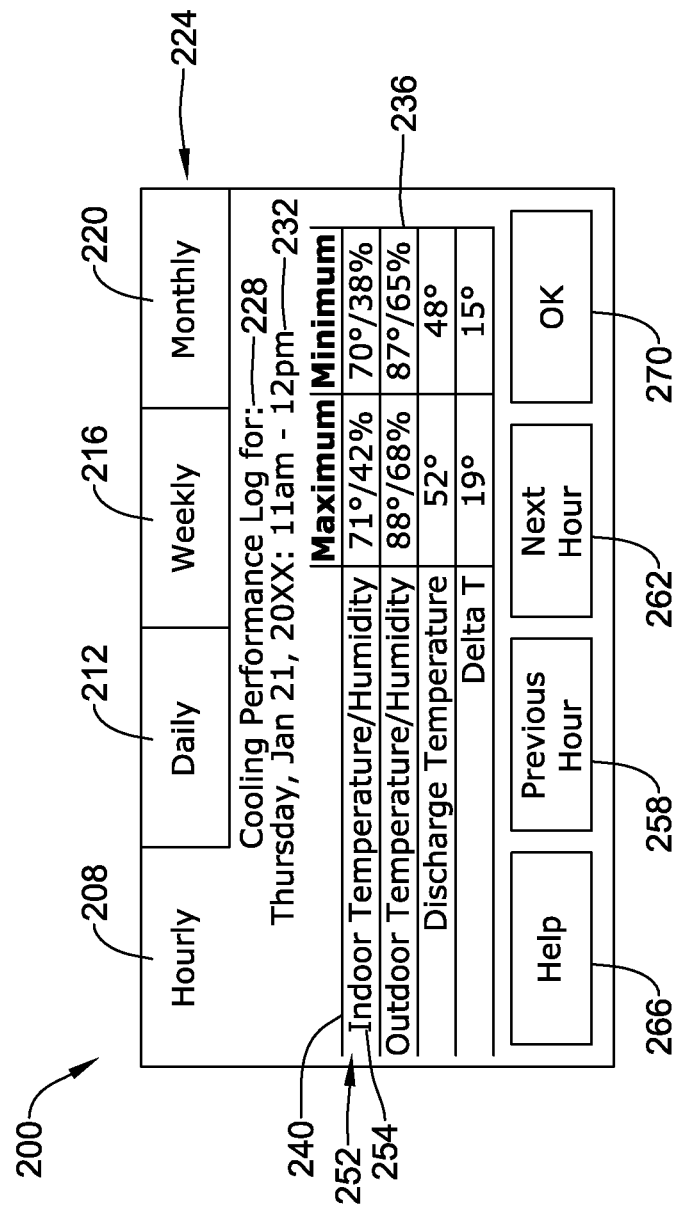

FIG. 9 provides an illustrative example of a performance data log screen 200 that may display one or more subsets of cooling performance data corresponding to a period of time of one hour. Screen 200 includes a first label 228 that identifies the performance log (e.g. cooling, heating, or combined). For example, first label 228 in FIG. 9 identifies the performance log as the "Cooling Performance Log." In some cases, screen 200 may also include a second label 232 that may identify the time period for which performance data is currently being displayed. For example, second label 232 identifies the time period for which performance data is currently displayed as "Thursday, Jan. 21: 11 AM-12 PM." In some cases, the year of the data period may be included in the second label 232. In some cases, second label 232 may be updated to display a new date and time period in response to selection of a new time period by a user for viewing.

In the example shown, performance data log screen 200 displays hourly performance data from the performance data log identified by the first label 228. In some cases, the hourly performance data may be presented in a table, such as table 236. In some cases, table 236 may be a scrolling table, in which case the performance data log screen may include a scroll bar and/or arrow keys (not shown) to facilitate navigation of table 236. In some cases, table 236 may display maximum and minimum values for one or more performance parameters identified in a first column 240 of table 236. The maximum and minimum values may be displayed in separate columns 244, 248 of table 236, but this is not required. Table 236 may include one or more rows 252, each corresponding to a performance parameter monitored by the HVAC controller 18. Each performance parameter may include a label 254 identifying the monitored performance parameter for which the maximum and minimum values are displayed. Because the performance data that may be logged and recorded by the HVAC controller 18 may be dependent upon type of HVAC equipment and the equipment setup, the HVAC controller 18 may be programmed to dynamically change the format of table 236 displayed on screen 200 so as to not display rows/labels 252, 254 for one or more performance parameters that do not include corresponding performance parameter data stored in the controller memory 52. For example, if the HVAC equipment does not include discharge air temperature sensor, then table 236 may not display a row/label 252, 254 corresponding to either the discharge air temperature or delta T.

In some cases, even if a particular type of HVAC equipment (e.g. air temperature sensor) may be present as part of the HVAC system 4, the HVAC equipment may not report any data, may report only data outside the allowable range, or may report data indicating the equipment is not operating or available over a certain time period for any number of reasons including, for example, an equipment malfunction. As such, table 236 may still include a row/label 252, 254 for the performance parameter related to that equipment type (e.g. air temperature sensor), but will not display any data in the adjacent row. Instead, the table 236 may include an indicator that may indicate that data is missing, out of range, or not available for the selected period of time. Exemplary indicators may include "--," "-," "N/A," "NA," "Error," and the like. If some data is reported during the selected time period, then table 236 may include a data entry related to that equipment type for the selected time period.

In some cases, performance data log screen 200 may include first and second buttons 258, 262 for navigating forward and backward in time within the hourly performance data stored in the performance data log. For example, selection of first button 258 labeled "Previous Hour" by a user may cause HVAC controller 18 to cause table 236 to display performance log data from the previous hour. Similarly, selection of second button 262 labeled "Next Hour" by a user may cause HVAC controller 18 to display performance log data from the next succeeding hour. In some cases, holding first button 258 or second button 262 may cause HVAC controller 18 to rapidly move through the hourly performance log data displayed in table 236, sometimes by four or more hours at a time. This feature may help a user to more quickly navigate to a desired time period contained with the performance data log.

Performance data log screen 200 may also include a HELP button 266 that, when selected may cause HVAC controller 18 to display additional information that may be helpful to a user in using the current screen. The user may select button 270 labeled "OK" or "Done" when they are finished viewing the performance log data displayed on screen 200. Selection of button 270 labeled "OK" may cause the HVAC controller 18 to return to a previous screen such as menu screen 184 shown in FIG. 8 or, in some cases, may cause the HVAC controller 18 to display a home screen such as, for example, home screen 72 of FIG. 4.

In some cases, a user may select another subset of performance data for viewing by selecting a corresponding tab or button 212, 216, 220 provided along a top portion 224 of screen 200. For example, a user may select tab 212 corresponding to daily performance data for the performance data log identified by the first label 228. In some cases, the daily performance data may overlap and/or include at least some of the hourly performance data contained within the identified performance data log.

FIG. 10 provides an illustrative example of a cooling performance data log screen 202 that may display one or more subsets of cooling performance data corresponding to a period of time of one day. Screen 202 includes a first label 228 that identifies the performance log (e.g. cooling). In the example shown, first label 228 still identifies the performance log as the "Cooling Performance Log." In some cases, screen 202 may also include second label 232 that may be updated to identify the day for which performance data is currently being displayed. For example, second label 232 identifies the day as "Thursday, Jan. 21." In some cases, the year of the data period may be included in second label 232. In some cases, second label 232 may be updated to identify a different day in response to selection of a different day by a user. Upon selection of a new subset of performance data by a user, table 236, as shown in FIG. 10, may be updated to display performance data for the selected day identified by first label 228. In the example shown in FIG. 10, table 236 has been updated to display cooling performance data for Thursday, January 21.

Similar to the performance data log screen 200 shown in FIG. 9, performance data log screen 202 may include first and second buttons 274, 278 for navigating forward and backward within the daily performance data stored in the performance data log. For example, selection of first button 274 labeled "Previous Day" by a user may cause HVAC controller 18 to display performance log data in table 236 from the previous day (e.g. January 20). Similarly, selection of second button 278 labeled "Next Day" by a user may cause HVAC controller 18 to display performance log data from the next day (e.g. January 22). In some cases, pressing and holding first button 274 or second button 278 may cause HVAC controller 18 to rapidly move through the daily performance log data displayed in table 236, sometimes by three or more days at a time. This feature may help a user more quickly navigate to a desired day contained with the performance data log.

The user may select button 270 labeled "OK" or "Done" when they are finished viewing the performance log data displayed on screen 202. Selection of button 270 labeled "OK" may cause the HVAC controller 18 to return to a previous screen such as menu screen 184 shown in FIG. 8 or, in some cases, may cause the HVAC controller 18 to display a home screen such as, for example, home screen 72 of FIG. 4.

In some cases, a user may select yet another subset of performance data for viewing by selecting the corresponding tab or button 208, 216, 220 provided long the top portion 224 of screen 202. For example, a user may select tab 216 corresponding to weekly performance data for the performance data log identified by the first label 228. In some cases, the weekly performance data may overlap and/or include at least some of the hourly and/or daily performance data contained within the identified performance data log.

FIG. 11 provides an illustrative example of a cooling performance data log screen 204 that may display one or more subsets of cooling performance data corresponding to a period of time of one week Like screens 200 and 202 of FIGS. 9 and 10, screen 204 may include a first label 228 that identifies the performance log (e.g. cooling). In the example shown, the first label 228 still identifies the performance log as the "Cooling Performance Log." In some cases, screen 202 may also include second label 232. Second label 232 may be updated to identify the week for which performance data is currently being displayed. In the example shown, second label 232 identifies the week for which performance data is currently being displayed as "Jan. 21-Jan. 28." In some cases, the year of the data period may be included in second label 232. In some cases, second label 232 may be updated to display a new week in response to selection of a different week by a user. Upon selection of a new subset of performance data by a user, table 236 may be updated to display performance data for the selected week identified by first label 228. In the example shown, table 236 has been updated to display cooling performance data for the week of Jan. 21-Jan. 28.

Similar to performance data log screens 200 and 202 shown in FIGS. 9 and 10, performance data log screen 204 may include first and second buttons 282, 286 for navigating forward and backward within the weekly performance data stored in the performance data log. For example, selection of first button 282 labeled "Previous Week" by a user may cause HVAC controller 18 to update table 236 to display performance log data from the previous week (e.g. January 13-January 20). Similarly, selection of second button 286 labeled "Next Week" by a user may cause HVAC controller 18 to display performance log data from the next succeeding week (e.g. January 29-February 6). In some cases, pressing and holding first button 282 or second button 286 may cause HVAC controller 18 to rapidly move through the weekly performance log data displayed in table 236, sometimes by three or more weeks at a time. This feature may help a user more quickly navigate to a desired week contained with the performance data log.

The user may select button 270 labeled "OK" or "Done" when they are finished viewing the performance log data displayed on screen 204. Selection of button 270 labeled "OK" may cause the HVAC controller 18 to return to a previous screen such as menu screen 184 shown in FIG. 8 or, in some cases, may cause the HVAC controller 18 to display a home screen such as, for example, home screen 72 of FIG. 4.

In some cases, a user may select yet another subset of performance data for viewing by selecting the corresponding tab or button 208, 212, 220 provided long a top portion 224 of screen 202. For example, a user may select tab 220 corresponding to monthly performance data for the performance data log identified by the first label 228. In some cases, the monthly performance data may overlap and/or include at least some of the hourly, daily, and/or weekly performance data contained within the identified performance data log.

FIG. 12 provides an illustrative example of a cooling performance data log screen 206 that may display one or more subsets of cooling performance data corresponding to a period of time of one month. Like screens 200, 202, and 204 of FIGS. 9, 10, and 11, screen 206 may include first label 228 that identifies the performance log (e.g. cooling). In the example shown, first label 228 still identifies the performance log as the "Cooling Performance Log." In some cases, screen 202 may also include second label 232. Second label 232 may be updated to identify the month for which performance data is currently being displayed. In the example shown, second label 232 identifies the month as "January." In some cases, second label 232 may be updated to display a new month in response to selection of a different month by a user. Upon selection of a new subset of performance data by a user, table 236 may be updated to display performance data for the selected month identified by first label 228 and second label 232. For example, in FIG. 12, table 236 has been updated to display cooling performance data for January.

Performance data log screen 206 may also include first and second buttons 290, 294 for navigating forward and backward within the monthly performance data stored in the performance data log. For example, selection of first button 290 labeled "Previous Month" by a user may cause HVAC controller 18 to update table 236 to display performance log data from the previous month (e.g. December). Similarly, selection of second button 294 labeled "Next Month" by a user may cause HVAC controller 18 to display performance log data from the next month (e.g. February). In some cases, pressing and holding first button 290 or second button 294 may cause HVAC controller 18 to rapidly move through the monthly performance log data displayed in table 236, sometimes by three or more months at a time. This feature may help a user to more quickly navigate to a desired month contained with the performance data log.

The user may select button 270 labeled "OK" or "Done" when they are finished viewing the performance log data displayed on screen 206. Selection of button 270 labeled "OK" may cause the HVAC controller 18 to return to a previous screen such as menu screen 184 shown in FIG. 8 or, in some cases, may cause the HVAC controller 18 to display a home screen such as, for example, home screen 72 of FIG. 4.

While FIGS. 9-12 generally relate to screens relating to a cooling performance log that may be displayed by HVAC controller 18, it should be understood that HVAC controller 18 may display one or more similar screens relating to a heating performance log, and/or any other suitable performance log as desired. For example, FIGS. 13 and 14 provide illustrative examples of performance data log screens 302, 306 that may be displayed on the display of the HVAC controller 18 upon selection of the HEATING PERFOMANCE LOG option 188c provided on the data logs menu screen 184 of FIG. 8.

Figure 13:
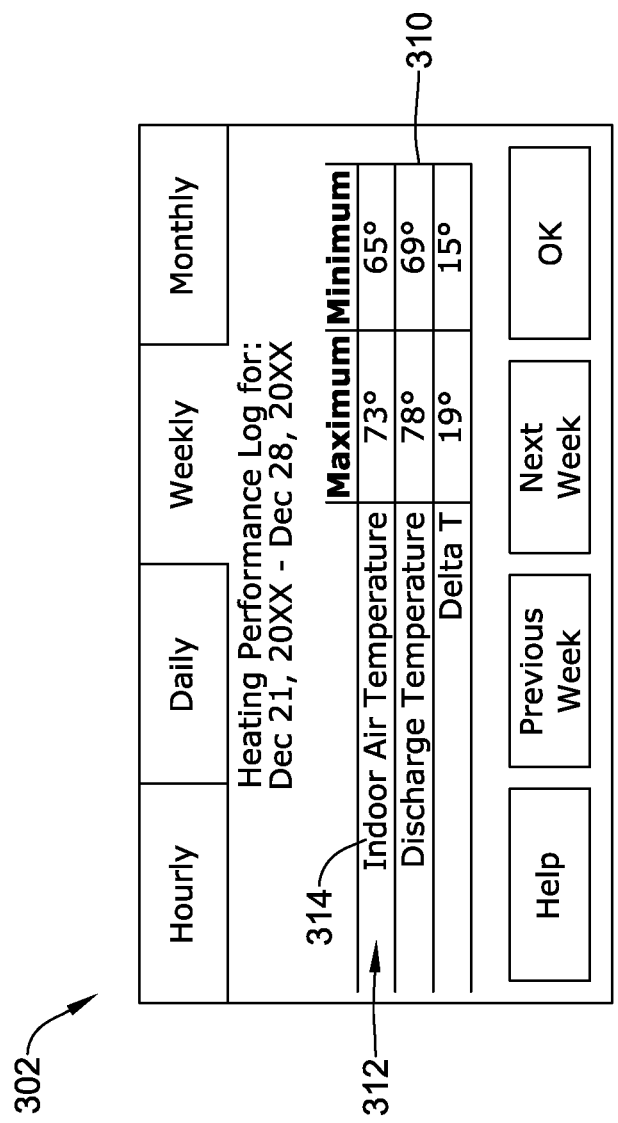
Figure 14:
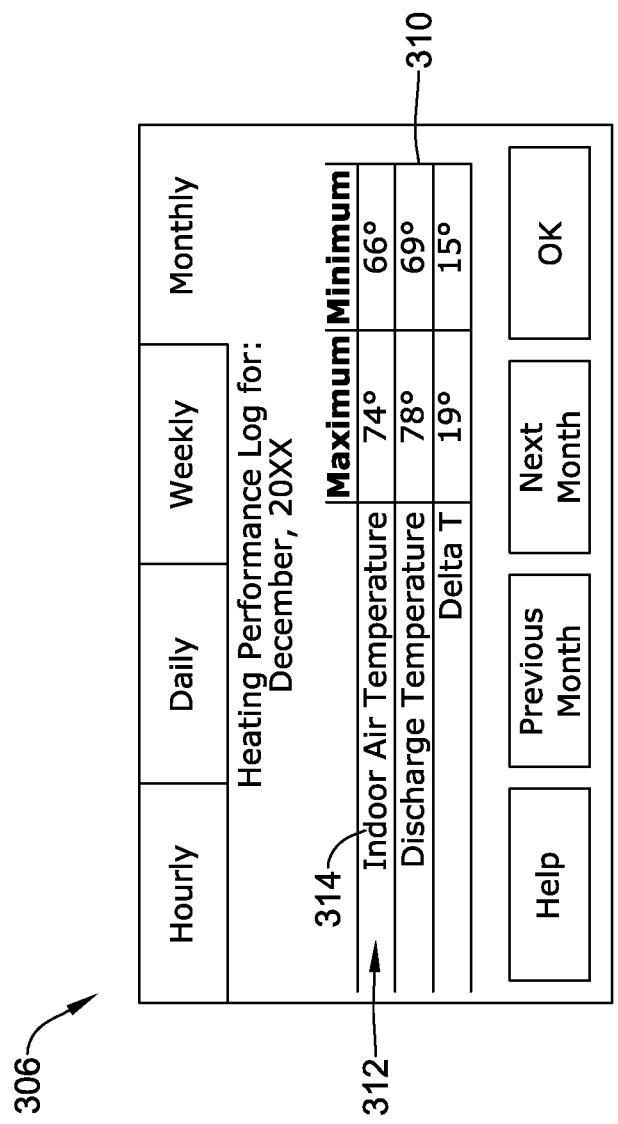

Performance data log screen 302 of FIG. 13 includes weekly heating performance data. Similarly, performance data log screen 306 of FIG. 14 includes monthly heating performance data. The weekly and monthly heating performance data may be presented in a table 310. Like above, table 310 includes maximum and minimum values for the indoor air temperature, the discharge air temperature, and the delta T. This is just an example of the type of data that may be included. It should be noted that unlike table 236 of screens 200, 202, 204 and 206 of FIG. 9-12, table 310 does not display data relating to the indoor humidity, the outdoor air temperature, and the outdoor humidity. As discussed above, the HVAC controller 18 may be programmed to dynamically change the format of table 310 displayed on screens 302, 306 so as to not display rows/labels 312/314 for one or more performance parameters that do not include heating performance parameter data stored in the HVAC controller memory 52. For example, if the HVAC heating equipment does not include an indoor humidity sensor, an outdoor air temperature sensor, and an outdoor humidity sensor, then table 310 may not display a row/label 312, 314 corresponding to these parameters.

In some cases, the HVAC controller 18 may be configured to display heating or cooling performance data by stage combination of the HVAC system. Referring now back to FIG. 8, a user may select either performance log option 188c or 188d to access a performance data log stored in the HVAC controller memory 52. For example, a user may select the HEATING PERFORMANCE LOG option 188c to access a heating performance log stored in the HVAC controller memory 52. In some instances, upon selection of the HEATING PERFORMANCE LOG option 188c, the HVAC controller 18 may then display a subsequent user screen 400, as shown in FIG. 15, which may query the user about viewing the selected performance log by stage combination of the HVAC system.

Figure 15:
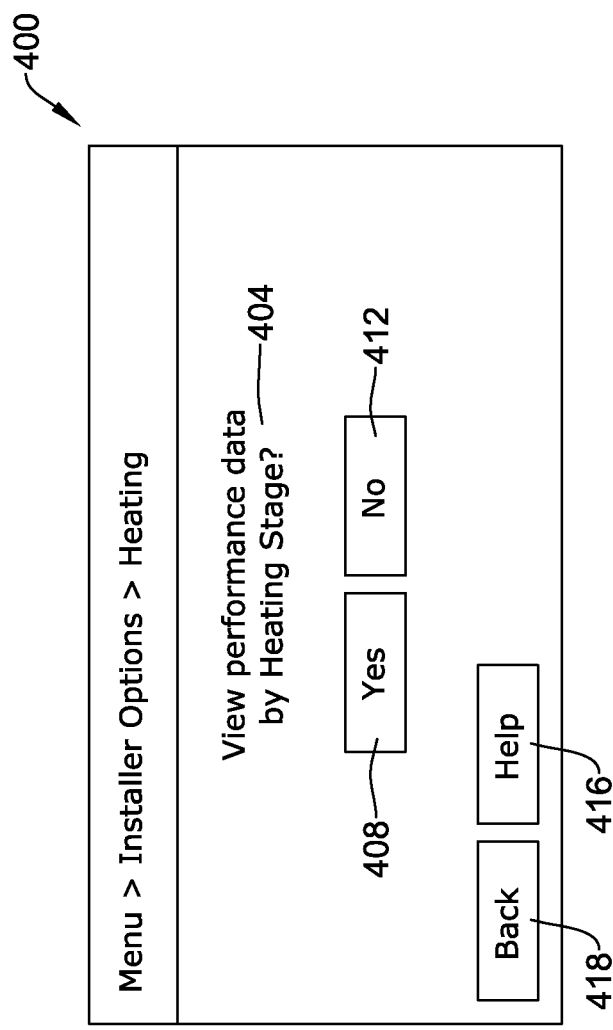

User query screen 400, as shown in FIG. 15, may include a user query statement 404 that queries a user about viewing heating performance data by equipment stage. User query screen 400 may also include one or more options for responding to the user query presented to a user by user query screen 400. For example, in some cases, user query screen 400 may include a first button 408 labeled "YES" and a second button 412 labeled "NO" for responding to the user query statement 404 displayed by the HVAC controller 18 on user query screen 400. User query screen 400 may also include a HELP button 416 that when selected by a user may causer the HVAC controller 18 to display additional information on the screen 400 that may be helpful to the user. User query screen 400 also may include a BACK button 418 that when selected by a user may cause the controller 18 to display a previous screen such as, for example, the data log menus screen 184 as shown in FIG. 8.

Figure 16:
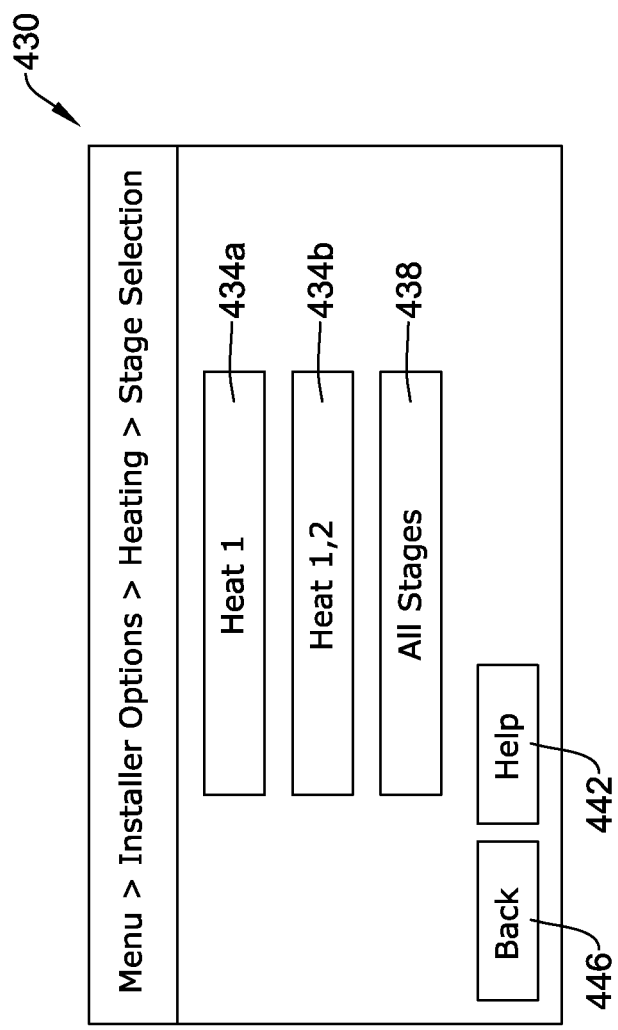

Upon receiving positive confirmation from a user via user query screen 400 that viewing the performance data by stage is desired, HVAC controller 18 may then display an equipment stage selection screen 430 as shown in FIG. 16. Equipment stage selection screen may 430 may display one or more selectable options 434a and/or 434b, each option 434a, 434b corresponding to an equipment stage for which performance data is available. If no data is available for a particular stage, then an option corresponding to that stage may not be available. In some cases, screen 430 may also display an additional option 438 that may correspond to all of the stages for which performance data may be available combined. User query screen 430 may also include a HELP button 442 that when selected by a user may causer the HVAC controller 18 to display additional information on the screen 430 that may be helpful to the user, and a BACK button 446 that when selected by a user may cause the controller 18 to display a previous screen.

In some instances, upon selection of the HEAT 1, 2 option 434b, the HVAC controller 18 may retrieve at least some of the heating performance data for the selected stage (e.g. HEAT 1, 2) stored in the memory 52 and display the heating performance data for the selected heating stage (e.g. HEAT 1, 2) via one or more screens such as, for example, screens 500, 502, 504, 506 as shown in the illustrative examples provided by FIGS. 17-20.

Figure 18:
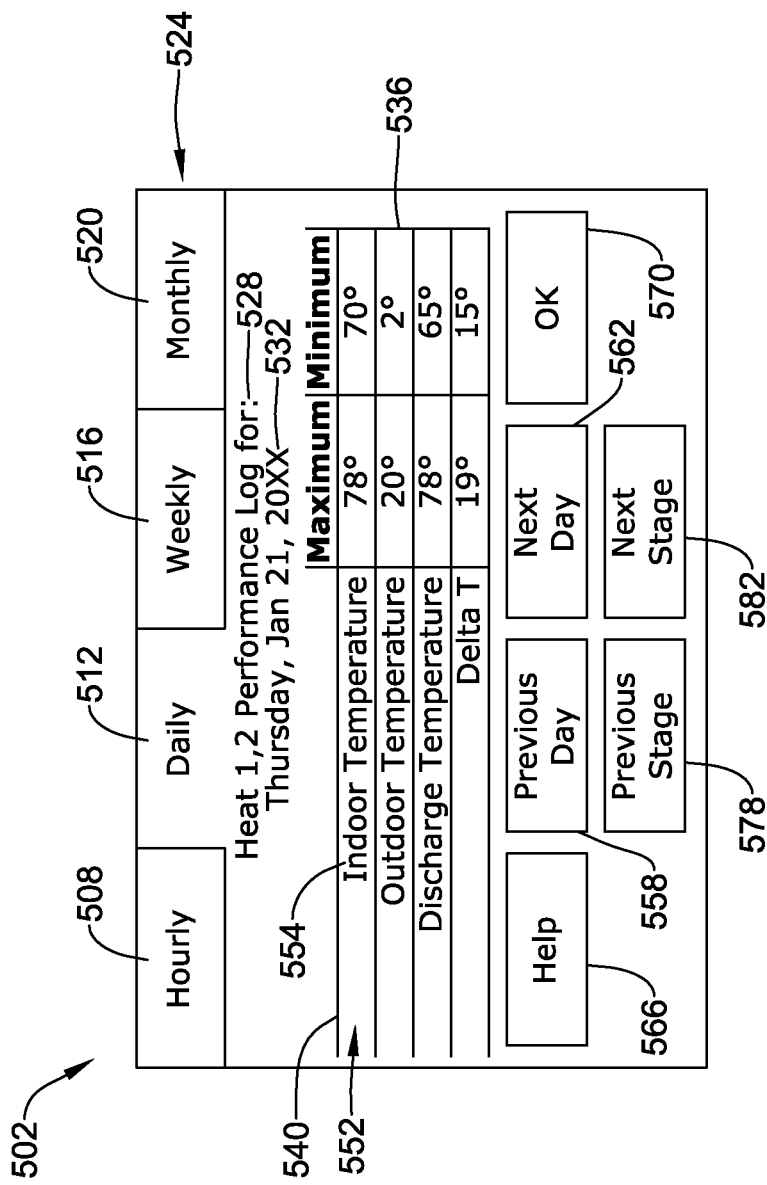
Figure 19:
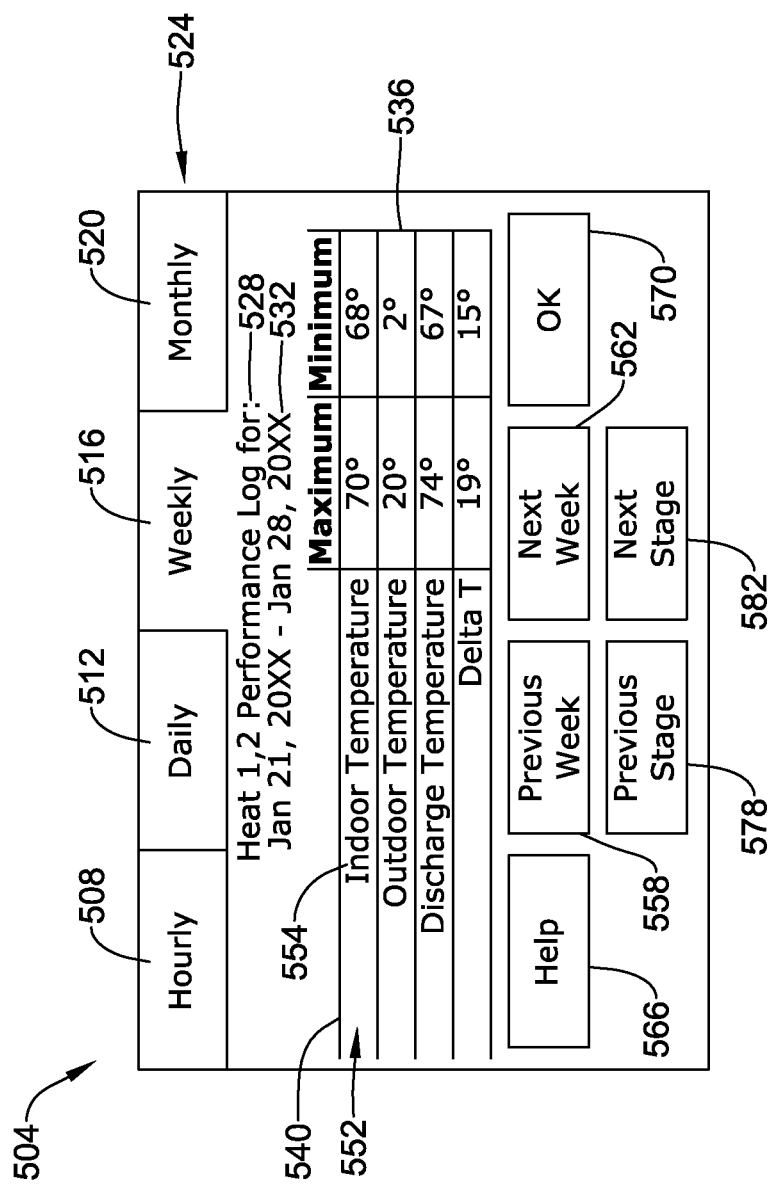
Figure 20:
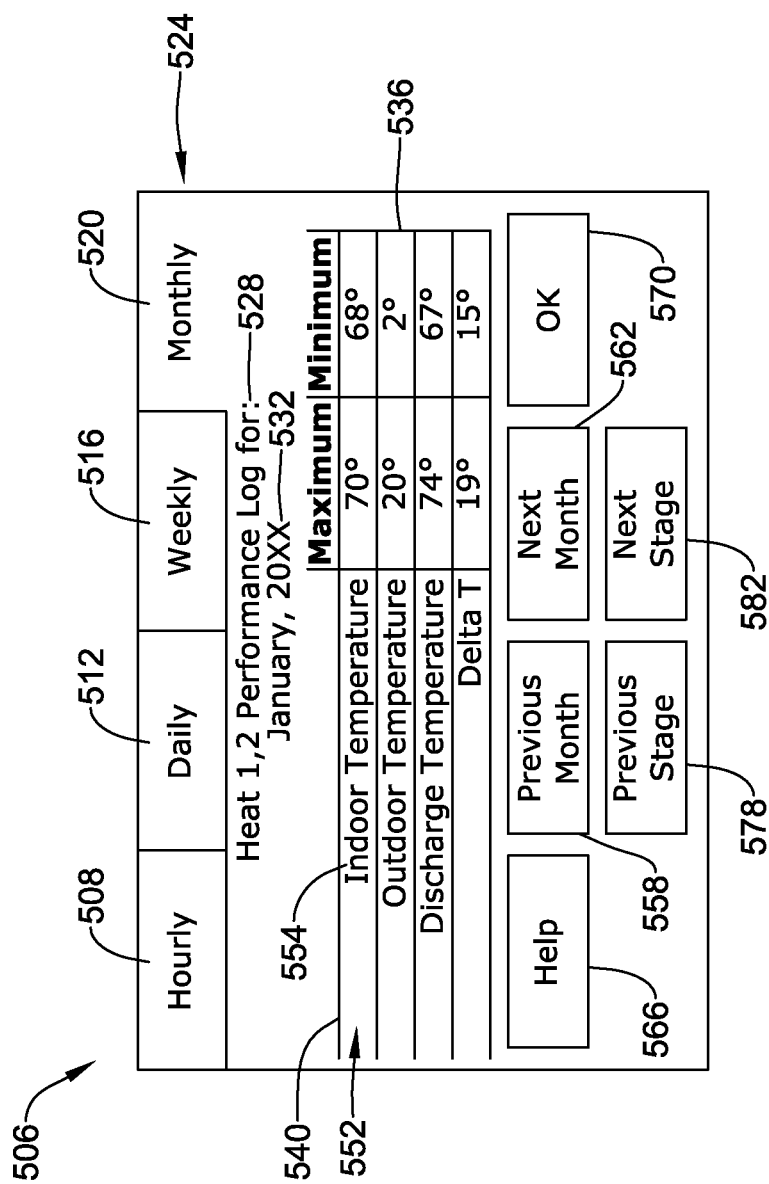

Tabs or buttons 508, 512, 516, and 520 shown in FIGS. 17-20 each correspond to a subset of data for a selected period of time (e.g. hourly, daily, weekly, monthly) for the selected heating stage (e.g. HEAT 1,2). A user may select a tab or button 508, 512, 516 or 520 that corresponds to the subset of HEAT 1, 2 performance data for which the user desires to view. In some cases, this may include a first user request selecting tab 508, a second user request selecting tab 512, a third user request selecting tab 516, and a fourth user request selecting tab 520. The user may be free to select any of tabs 508, 512, 516 or 520 in any order. In one example, a user may select: the HOURLY tab 508 (see FIG. 17) to view the most recent HEAT 1, 2 performance data on an hourly basis (FIG. 17); the DAILY tab 512 to review the most recent HEAT 1, 2 performance data on a daily basis (FIG. 18); the WEEKLY tab 516 to review HEAT 1, 2 performance data on a weekly basis (FIG. 19); and/or the MONTHLY tab 520 to review HEAT 1, 2 performance data on monthly basis (FIG. 20). In some cases, and to help reduce the amount of performance parameter data that must be stored in memory 52, only maximum and/or minimum values may be stored in the performance log for each stage of heating and/or cooling equipment, and then subsequently displayed on screens 500, 502, 504 and 506.

Figure 17:
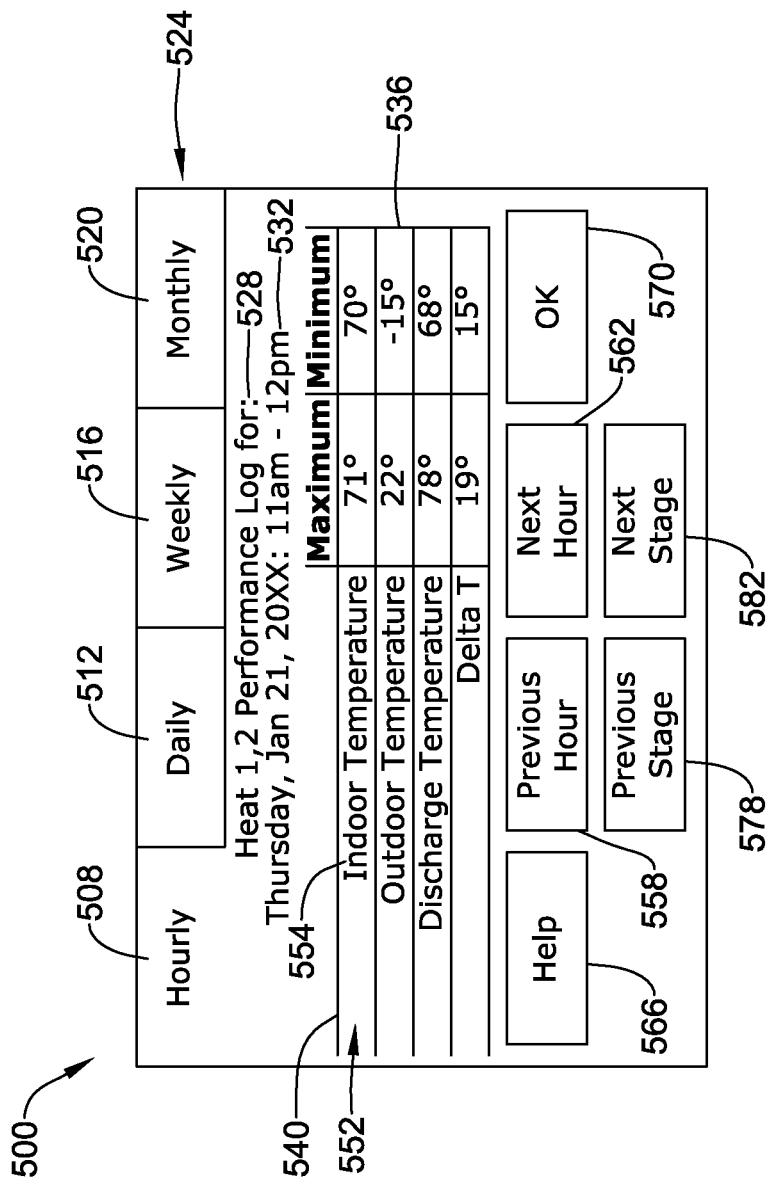

FIG. 17 provides an illustrative example of an equipment stage performance data log screen 500 that may display one or more subsets of heating performance data for a selected heating equipment stage (e.g. HEAT 1, 2) corresponding to a period of time of one hour. Screen 500 includes a first label 528 that identifies the performance log (e.g. COOL 1, COOL 1, 2, COOL All Stages, HEAT 1, HEAT 1, 2, HEAT All Stages, and the like). For example, first label 528 in FIG. 17 identifies the performance log as the "HEAT 1, 2 Performance Log." In some cases, screen 500 may also include a second label 532 that may identify the time period for which the HEAT 1, 2, performance data is currently being displayed. For example, second label 532 identifies the time period for which performance data is currently displayed as "Thursday, Jan. 21: 11 AM-12 PM." In some cases, the year of the data period may be included in the second label 532. In some cases, second label 532 may be updated to display a new date and time period in response to selection of a new time period by a user for viewing.

In the example shown, equipment stage performance data log screen 500 displays hourly performance data from the performance data log identified by the first label 528. In some cases, the hourly performance data may be presented in a table, such as table 536. In some cases, table 536 may be a scrolling table, in which case the performance data log screen may include a scroll bar and/or arrow keys (not shown) to facilitate navigation of table 536. In some cases, table 536 may display maximum and minimum values for one or more performance parameters identified in a first column 540 of table 536. The maximum and minimum values may be displayed in separate columns of table 536, but this is not required. Table 536 may include one or more rows 552, each corresponding to a performance parameter monitored by the HVAC controller 18. Each performance parameter may include a label 554 identifying the monitored performance parameter for which the maximum and minimum values are displayed. Because the performance data that may be logged and recorded by the HVAC controller 18 may be dependent upon the type of HVAC equipment and the equipment setup, the HVAC controller 18 may be programmed to dynamically change the format of table 536 displayed on screen 500 so as to not display rows/labels 552, 554 for one or more performance parameters that do not include corresponding performance parameter data stored in the controller memory 52. For example, if the HVAC equipment does not include discharge air temperature sensor, then table 536 may not display a row/label 552, 554 corresponding to either the discharge air temperature or delta T.

In some cases, equipment stage performance data log screen 500 may include first and second buttons 558, 562 for navigating forward and backward in time within the hourly performance data stored in the performance data log. For example, selection of first button 558 labeled "Previous Hour" by a user may cause HVAC controller 18 to cause table 536 to display performance log data from the previous hour. Similarly, selection of second button 262 labeled "Next Hour" by a user may cause HVAC controller 18 to display performance log data from the next succeeding hour. In some cases, holding first button 558 or second button 562 may cause HVAC controller 18 to rapidly move through the hourly performance log data displayed in table 536, sometimes by four or more hours at a time. This feature may help a user to more quickly navigate to a desired time period contained with the performance data log.

Equipment stage performance data log screen 500 may also include a HELP button 566 that, when selected may cause HVAC controller 18 to display additional information that may be helpful to a user in using the current screen. The user may select button 570 labeled "OK" or "Done" when they are finished viewing the performance log data displayed on screen 500. Selection of button 570 labeled "OK" may cause the HVAC controller 18 to return to a previous screen such as menu screen 184 shown in FIG. 8 or, in some cases, may cause the HVAC controller 18 to display a home screen such as, for example, home screen 72 of FIG. 4.

In some cases, a user may select another subset of performance data corresponding to an equipment stage for a selected mode for viewing by selecting the corresponding tab or button 512, 516, 520 provided along a top portion 524 of screen 500. For example, a user may select tab 512 corresponding to daily performance data by equipment stage for the performance data log identified by the first label 528. In some cases, the daily performance data may overlap and/or include at least some of the hourly performance data contained within the identified performance data log. FIG. 18 provides an illustrative example of an equipment stage performance data log screen 502 that may display one or more subsets of heating performance data corresponding to a period of time of one day for a selected equipment stage (e.g. HEAT 1, 2).

In some cases, a user may select yet another subset of performance data corresponding to an equipment stage for a selected mode for viewing by selecting the corresponding tab or button 508, 516, 520 provided long the top portion 524 of screen 502. For example, a user may select tab 516 corresponding to weekly performance data for the performance data log identified by the first label 228. In some cases, the weekly performance data may overlap and/or include at least some of the hourly and/or daily performance data contained within the identified performance data log. FIG. 19 provides an illustrative example of an equipment stage performance data log screen 504 that may display one or more subsets of heating performance data corresponding to a period of time of one week for a selected equipment stage.

In some cases, a user may select yet another subset of performance data corresponding to an equipment stage for a selected mode for viewing by selecting the corresponding tab or button 508, 512, 520 provided long a top portion 524 of screen 502. For example, a user may select tab 520 corresponding to monthly performance data for the equipment stage performance data log identified by the first label 528. In some cases, the monthly performance data for the identified equipment stage may overlap and/or include at least some of the hourly, daily, and/or weekly performance data contained within the identified performance data log. FIG. 20 provides an illustrative example of an equipment stage performance data log screen 502 that may display one or more subsets of heating performance data corresponding to a period of time of one day for a selected equipment stage (e.g. HEAT 1, 2).

In some cases, equipment stage performance data log screens 500, 502, 504, and 506 may also include first and second buttons 578, 582 for navigating forward and backward between different equipment stages for which performance data may be available. This may allow a user to quickly access information for a different equipment stage for which performance data may be available. The different equipment stages for which performance data may be available may be listed on the stage selection menu screen 430, as shown in FIG. 16 discussed above. In some cases, selection of button 578 labeled "Previous Stage" by a user may cause HVAC controller 18 to display performance log data corresponding to a different equipment stage (e.g. HEAT 1) for the identified time period (e.g. Thursday, Jan. 21: 11 AM-12 PM, Thursday, Jan. 21, Jan. 21-Jan. 28 and/or January as shown in FIGS. 17-20). Selection of button 582 labeled "Next Stage" by a user may cause HVAC controller 18 to display performance log data corresponding to yet another equipment stage (e.g. HEAT 1, 2, 3) or a performance log showing the combined performance data for all available equipment stages for the identified time period. In some cases, holding first button 578 or second button 582 may cause HVAC controller 18 to rapidly move through the available performance logs by stage listed on the stage selection menu screen 430. While first and second buttons 578 and 582 may include labels, as provided in the illustrative examples, it is also contemplated that first and second buttons 578 and 582 may also be represented by first and second arrow keys, forward and backward arrows keys, and the like. These are just some examples.

Figure 21:
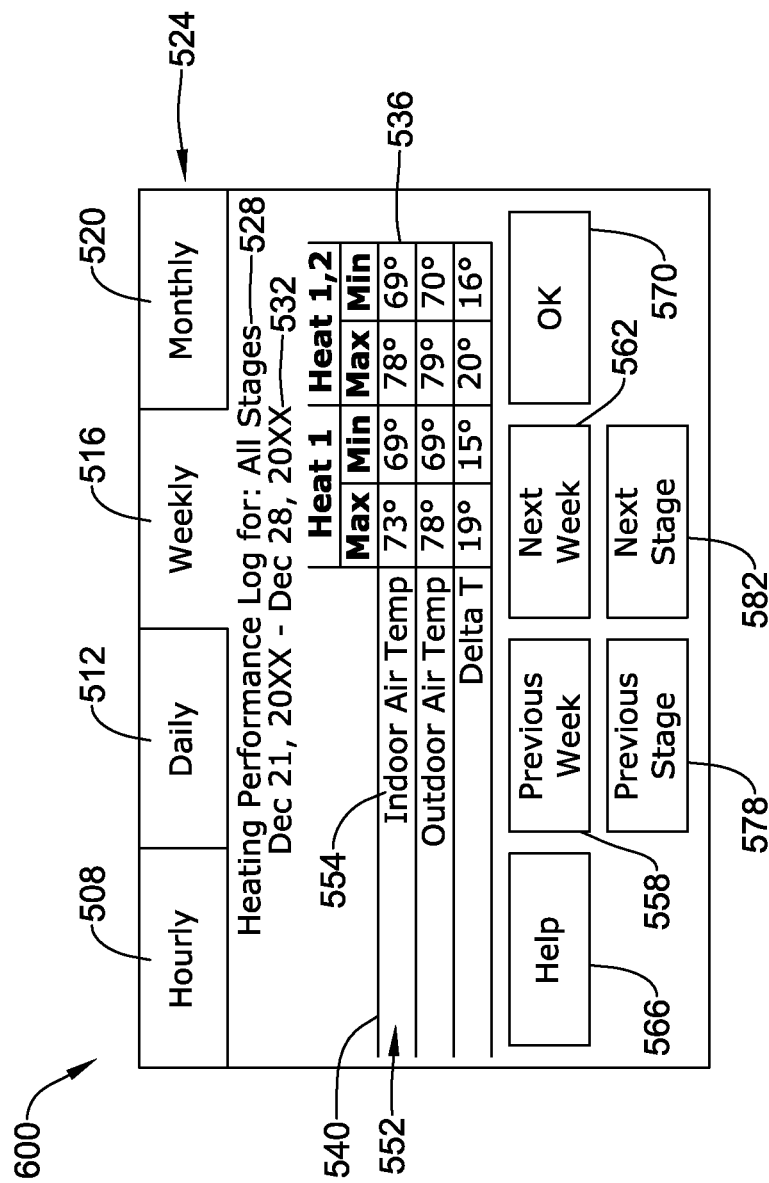

As discussed above, HVAC controller 18 may be configured to display the combined performance data for all available equipment stages for a selected time period for the identified mode (e.g. heating or cooling). In some cases, the HVAC controller 18 may be configured to retrieve the combined performance data for all available equipment stages for the identified mode upon selection of option 438 displayed on equipment stage selection menu screen 430 as shown in FIG. 16. In other cases, selection of the "Previous Stage" button 578 or the "Next Stage" button 582 by a user may cause HVAC controller 18 to retrieve the combined performance data for all available equipment stages for the identified mode for the selected time period. The combined performance data for all available equipment stages for the identified mode may displayed on a combined stages performance log data screen 600, as shown in FIG. 21.

While FIGS. 17-21 generally relate to screens relating to a heating equipment stage performance log that may be displayed by HVAC controller 18, it should be understood that HVAC controller 18 may display one or more similar screens relating to a cooling equipment stage performance log, and/or any other suitable performance log as desired.

In some cases, an HVAC system may include two or more different equipment types for either heating and/or cooling. For example, an HVAC system for heating may include a heat pump or compressor and a backup heat. Each of the heat pump and the backup heat may have multiple equipment stages. As such, for HVAC systems including two or more different equipment types, it may be desirable to view a performance data log by equipment type. In some cases, the data for the selected equipment type also may be presented by equipment stage.

Referring now again to FIG. 8, a user may select either performance log option 188c or 188d to access a performance data log stored in the HVAC controller memory 52. For example, a user may select the HEATING PERFORMANCE LOG option 188c to access a heating performance log stored in the HVAC controller memory 52. In some instances, when the HVAC system 4 includes two or more heating equipment types, selection of the HEATING PERFORMANCE LOG option 188c may cause the controller to display a subsequent screen 700 or 704 (FIGS. 22 and 23) that may allow a user to select an equipment type and/or equipment stage for which they can then view a performance data log.

Figure 22:
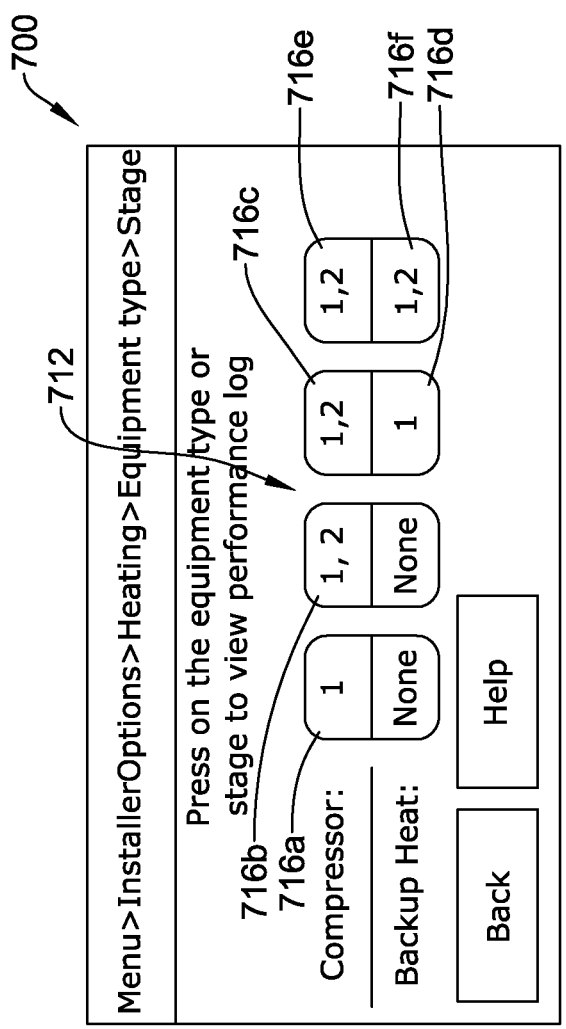
Figure 23:
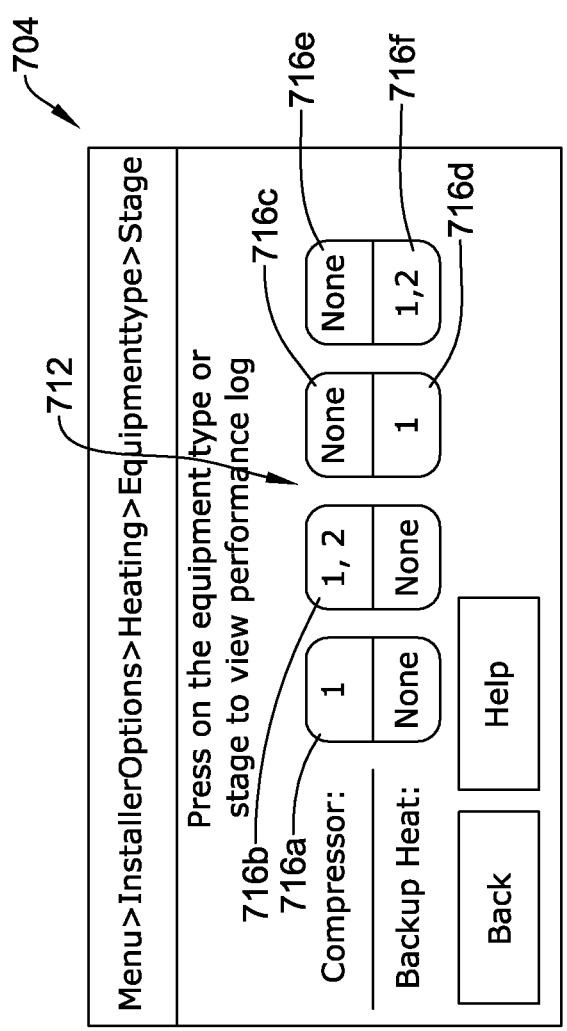

FIGS. 22 and 23 provide illustrative screens 700 and 704 that relate to a heating system that includes a compressor and a backup heat. It will be understood that similar screens may be displayed for a cooling system having two or more cooling equipment types. In some cases, each of the compressor and the backup heat may have multiple stages. Backup heat sometimes may be referred to as an emergency heat and is often electric. Screen 700 relates to a system in which the backup heat is allowed to run at the same time as the compressor. Screen 704 relates to a system in which the backup heat is not allowed to run at the same time as the compressor. Each of the different equipment types and their respective stages (if applicable) may be presented in a table 712. The table may include one or more selectable options 716, each option corresponding to a different equipment type and/or equipment stage, as applicable. Upon selection of an equipment type and/or equipment stage, the HVAC controller 18 may then display a performance data log for the selected equipment type. In some cases, if the selected equipment type has more than one stage, the HVAC system may display a performance data log for the selected equipment type by equipment stage. The performance data for the selected equipment type may be provided as a subset of data corresponding to a one hour period, a day period, a one week period, and a one month period, as discussed above. Additionally, the HVAC controller 18 may be configured to allow a user to navigate between different selected periods of time within the performance data log and between different equipment types and/or stages without having to return screen 700 or 704.

It should be noted with respect to each of the illustrative examples discussed herein, that if the HVAC controller 18 is not in direct control of the one or more HVAC components, a performance log for heating may not offer display of the minimum discharge temperature and the minimum delta T. Similarly, if the HVAC controller 18 is not in direct control of the one or more HVAC components, a performance log for cooling may not offer display of the maximum discharge temperature. The performance log also may not display what the internal algorithm considers the maximum delta T that would normally be displayed as the minimum delta T. Finally, if all of the minimum and maximum indoor temperature, minimum and maximum outdoor temperature, minimum and maximum indoor humidity, minimum and maximum outdoor humidity, minimum and maximum discharge temperature, and minimum and maximum delta T information is available, then the results may be displayed in a table. However, if some discharge and delta T information is not to be displayed, then the discharge and delta T values could be displayed separate from the table so that it does not appear that information is missing.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A heating, ventilation and air conditioning (HVAC) controller for use with an HVAC system including one or more HVAC components, the HVAC controller comprising:
    a user interface including a display;
    a memory;
    a controller coupled to the user interface and the memory, the controller configured to:
        repeatedly record in the memory a minimum value and a maximum value for a first sensed HVAC performance parameter over a time interval with a first duration, each recorded minimum value and maximum value corresponding to a time interval of the first duration resulting in a log entry in a first log category, wherein the number of log entries in the first log category is limited to a first number of log entries on a first-in-first-out basis;
        repeatedly record in the memory the minimum value and the maximum value of the first sensed HVAC performance parameter over a time interval with a second duration that is longer than the first duration, each recorded minimum value and maximum value corresponding to a time interval of the second duration resulting in a log entry in a second log category, wherein the number of log entries in the second log category is limited to a second number of log entries on a first-in-first-out basis, the second number of log entries being different from the first number of log entries;
        receive a first user request via the user interface, and in response to the first user request, retrieve at least some of the log entries in the first log category, and to display at least some of the retrieved log entries in the first log category on the display of the HVAC controller; and
        receive a second user request via the user interface, and in response to the second user request, retrieve at least some of the log entries in the second log category, and to display at least some of the retrieved log entries in the second log category on the display of the HVAC controller; and
        dynamically adjust a format of the display of the log entries based on a type of performance parameter stored in the log entries.

2. The HVAC controller of claim 1, wherein the first duration comprises an hour.

3. The HVAC controller of claim 1, wherein the second duration comprises a day.

4. The HVAC controller of claim 1, wherein the second duration comprises a week.

5. The HVAC controller of claim 1, wherein the second duration comprises a month.

6. The HVAC controller of claim 1, wherein the first number of log entries is greater than the second number of log entries.

7. The HVAC controller of claim 1, wherein the first sensed HVAC performance parameter comprises an indoor temperature.

8. The HVAC controller of claim 1, wherein the first sensed HVAC performance parameter comprises an indoor humidity.

9. The HVAC controller of claim 1,
    wherein the first sensed HVAC performance parameter corresponds to a first stage of the HVAC system,
    wherein the log entry in the first log category further comprises a second sensed HVAC performance parameter, wherein the second sensed HVAC performance parameter corresponds to a second stage of the HVAC system, and
    wherein the controller is configured to display performance data by stage combination.

10. The HVAC controller of claim 1, wherein the log entry in the first log category further comprises a second sensed HVAC performance parameter, wherein the second sensed HVAC performance parameter comprises an outdoor temperature.

11. The HVAC controller of claim 1, wherein the first sensed HVAC performance parameter comprises a delta T value across a heat exchanger of an HVAC component of the HVAC system.

12. The HVAC controller of claim 1, wherein the first sensed HVAC performance parameter comprises a discharge air temperature at an output of an HVAC component of the HVAC system.

13. An HVAC controller for use with an HVAC system including one or more HVAC components, the HVAC controller comprising:
    a user interface including a display;
    a memory;
    a controller coupled to the user interface and the memory, the controller configured to:
        repeatedly record in the memory a minimum value and maximum value of a delta T value across a heat exchanger of an HVAC component of the HVAC system over a time interval with a first duration, each recorded minimum value and maximum value corresponding to a time interval of the first duration resulting in a log entry in a first log category, wherein the number of log entries in the first log category are limited to a first number of log entries on a first-in-first-out basis;

repeatedly record in the memory the minimum value and the maximum value of the delta T value over a time interval with a second duration that is longer than the first duration, each recorded minimum value and maximum value corresponding to a time interval of the second duration resulting in a log entry in a second log category, wherein the number of log entries in the second log category are limited to a second number of log entries on a first-in-first-out basis, the second number of log entries being less than the first number of log entries;

receive a first user request via the user interface, and in response to the first user request, retrieve at least some of the log entries in the first log category, and to display at least some of the retrieved log entries in the first log category on the display of the HVAC controller; and receive a second user request via the user interface, and in response to the second user request, retrieve at least some of the log entries in the second log category, and to display at least some of the retrieved log entries in the second log category on the display of the HVAC controller dynamically adjust a format of the display of the log entries based on a type of heat exchanger of the HVAC component.

14. The HVAC controller of claim 13, wherein the first duration comprises an hour.

15. The HVAC controller of claim 13, wherein the second duration comprises a day.

16. The HVAC controller of claim 13, wherein the second duration comprises a week.

17. The HVAC controller of claim 13, wherein the second duration comprises a month.

18. An HVAC controller for use with an HVAC system including one or more HVAC components, the HVAC controller comprising:

a user interface including a display;
a memory;
a controller coupled to the user interface and the memory, the controller configured to:

repeatedly record in the memory a minimum value and maximum value of a discharge air temperature at an output of an HVAC component of the HVAC system over a time interval with a first duration, each recorded minimum and maximum value corresponding to a time interval of the first duration resulting in a log entry in a first log category, wherein the number of log entries in the first log category are limited to a first number of log entries on a first-in-first-out basis;

repeatedly record in the memory the minimum value and the maximum value of the discharge air temperature over a time interval with a second duration that is longer than the first duration, each recorded minimum value and maximum value corresponding to a time interval of the second duration resulting in a log entry in a second log category, wherein the number of log entries in the second log category are limited to a second number of log entries on a first-in-first-out basis, the second number of log entries being less than the first number of log entries;

receive a first user request via the user interface, and in response to the first user request, retrieve at least some of the log entries in the first log category, and to display at least some of the retrieved log entries in the first log category on the display of the HVAC controller; and receive a second user request via the user interface, and in response to the second user request, retrieve at least some of the log entries in the second log category, and to display at least some of the retrieved log entries in the second log category on the display of the HVAC controller dynamically adjust a format of the display of the log entries based on a type of HVAC component of the HVAC system for which the discharge air temperature is recorded.

19. The HVAC controller of claim 18, wherein the second duration comprises a week.

20. The HVAC controller of claim 18, wherein the second duration comprises a month.

* * * * *